United States Patent
Ito

(10) Patent No.: US 8,108,591 B2
(45) Date of Patent: Jan. 31, 2012

(54) SEMICONDUCTOR DEVICE WITH A FIRST INTERFACE TO CONNECT TO A MEMORY CARD HAVING A LOCK AND UNLOCK STATE AND A SECOND INTERFACE TO CONNECT TO A HOST DEVICE AND MEMORY CARD INTIALIZATION METHOD

(75) Inventor: Takafumi Ito, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 755 days.

(21) Appl. No.: 12/191,569

(22) Filed: Aug. 14, 2008

(65) Prior Publication Data

US 2009/0055573 A1 Feb. 26, 2009

(30) Foreign Application Priority Data

Aug. 22, 2007 (JP) ................................ 2007-215984

(51) Int. Cl.
*G06F 13/00* (2006.01)
(52) U.S. Cl. ........ 711/103; 711/115; 711/163; 711/164; 710/13; 365/52; 235/380
(58) Field of Classification Search .................. 711/103, 711/115, 163, 164; 710/13; 365/52; 235/380
See application file for complete search history.

(56) References Cited

U.S. PATENT DOCUMENTS

| 7,305,535 B2 * | 12/2007 | Harari et al. .................. 711/164 |
| 2004/0268074 A1 * | 12/2004 | Yagi .............................. 711/164 |
| 2007/0268111 A1 * | 11/2007 | Chng et al. ................... 340/5.74 |

FOREIGN PATENT DOCUMENTS

| JP | 2002-74277 | 3/2002 |
| JP | 2003-132305 | 5/2003 |

* cited by examiner

*Primary Examiner* — Hong Kim
(74) *Attorney, Agent, or Firm* — Oblon, Spivak, McClelland, Maier & Neustadt, L.L.P.

(57) ABSTRACT

A semiconductor device includes first and second interfaces, and a control unit. The first interface is capable of being connected to a memory card and communicating with the memory card. The memory card has a nonvolatile semiconductor memory and has an unlock state and a lock state. The memory card in the unlock state permits an access to the nonvolatile semiconductor memory. The memory card in the lock state prohibits the access. The second interface is capable of being connected to a host device and communicating with the host device. The host device generates an access command to access the memory card. The control unit operates based on the access command sent from the host device through the second interface so as to release the lock state of the memory card, when the memory card is connected to the first interface.

16 Claims, 20 Drawing Sheets

SCSI command to be set in end point EP1 when pass-through mode is selected

| Operation Code | Extension Command |
|---|---|
| D0h | SD Card Passthrough Mode |
| D1h | SD Execute (No Data) |
| D2h | SD Execute (read from SD Card) |
| D3h | SD Execute (write to SD Card) |
| D4h | Get Response |
| D5h | (Reserved) |
| D6h | SD Hardware Reset |

Relation between extension SCSI command and operation code

F I G. 8

| | 7 | 6 | 5 | 4 | 3 | 2 | 1 | 0 |
|---|---|---|---|---|---|---|---|---|
| 0 | Operation Code ||||||||
| 1 | LUN |||| Command Mode ||||
| 2 | Signature : 53h ( 'S' ) ||||||||
| 3 | Signature : 44h ( 'D' ) ||||||||
| 4 | Signature : 20h ( ' ' ) ||||||||
| 5 | Signature : 43h ( 'C' ) ||||||||
| 6 | Signature : 61h ( 'a' ) ||||||||
| 7 | Signature : 72h ( 'r' ) ||||||||
| 8 | Signature : 64h ( 'd' ) ||||||||
| 9 | Control Byte ||||||||

Command Mode : 0000 : Passthrough command disables
0001 : Passthrough command enables Pass-through mode set command ("D0h")

FIG. 9

| | 7 | 6 | 5 | 4 | 3 | 2 | 1 | 0 |
|---|---|---|---|---|---|---|---|---|
| 0 | 00h (Fixed) ||||||||
| 1 | 00h (Fixed) ||||||||
| 2 | 00h (Reserved) ||||||||
| 3 | 0Eh (Fixed) ||||||||
| 4 | Version Number : 00h ||||||||
| 5 | WP | Media Type |||||||
| 6 | bit7 | RCA (Low Byte) |||||| bit0 |
| 7 | bit15 | RCA (High Byte) |||||| bit8 |
| 8 | Signature : 53h( 'S' ) ||||||||
| 9 | Signature : 44h( 'D' ) ||||||||
| 10 | Signature : 20h( ' ' ) ||||||||
| 11 | Signature : 43h( 'C' ) ||||||||
| 12 | Signature : 61h( 'a' ) ||||||||
| 13 | Signature : 72h( 'r' ) ||||||||
| 14 | Signature : 64h( 'd' ) ||||||||
| 15 | Max LUN Number ||||||||
| 16 | 00h (Fixed) ||||||||
| 17 | 00h (Fixed) ||||||||

WP············· 0 : no write protect, 1 : write protect
Media Type········ 0 : not present, 1 : SD card, 2 : medium compatible with SD card
3 : medium resembling SD card (Ex. SDIO card)
Max LUN Number···0 : one drive, 1 : two drives, normally "0"

Response

FIG. 10

|  | 7 | 6 | 5 | 4 | 3 | 2 | 1 | 0 |
|---|---|---|---|---|---|---|---|---|
| 0 | Operation Code ||||||||
| 1 | LUN |||| RSV | Send cmd12 | Standby | ACMD |
| 2 | Reserved || (B45) | SD Command Index |||||
| 3 | (B39) | SD Command Argument |||||||
| 4 | | |||||||
| 5 | | |||||||
| 6 | | |||||||
| 7 | (MSB) | Data Transfer Length |||||||
| 8 | | |||||||
| 9 | | |||||||
| 10 | Response Type ||||||||
| 11 | Control Byte ||||||||

SD card command buried in extension SCSI command

SD card execution command ( "D1h" , "D2h" , "D3h" )

F I G. 1 1

|   | 7 | 6 | 5 | 4 | 3 | 2 | 1 | 0 |
|---|---|---|---|---|---|---|---|---|
| 0 | Operation Code ||||||||
| 1 | LUN |||| Command Mode ||||
| 2 | Signature : 53h ( 'S' ) ||||||||
| 3 | Signature : 44h ( 'D' ) ||||||||
| 4 | Signature : 20h ( ' ' ) ||||||||
| 5 | Signature : 43h ( 'C' ) ||||||||
| 6 | Signature : 61h ( 'a' ) ||||||||
| 7 | Signature : 72h ( 'r' ) ||||||||
| 8 | Signature : 64h ( 'd' ) ||||||||
| 9 | Control Byte ||||||||

Initialization of a Firmware and SD Card is performed.
The 1st command after reset returns a media changed error.
Command mode: 0000: SD card power off → ON and initialization
0001: reset command (CMD 0) and initialization
(without SD card power off → ON)

<u>Hardware reset command ( "D6h" )</u>

FIG. 12

|   | 7 | 6 | 5 | 4 | 3 | 2 | 1 | 0 |
|---|---|---|---|---|---|---|---|---|
| 0 | Operation Code ||||||||
| 1 | LUN |||| Reserved ||||
| 2 | Reserved ||||||||
| 3 | Reserved ||||||||
| 4 | Reserved ||||||||
| 5 | Reserved ||||||||
| 6 | Reserved ||||||||
| 7 | (MSB) | Data Transfer Length |||||||
| 8 |  | (LSB) |||||||
| 9 | Control Byte ||||||||

<u>Response acquisition command ( "D4h" )</u>

FIG. 13

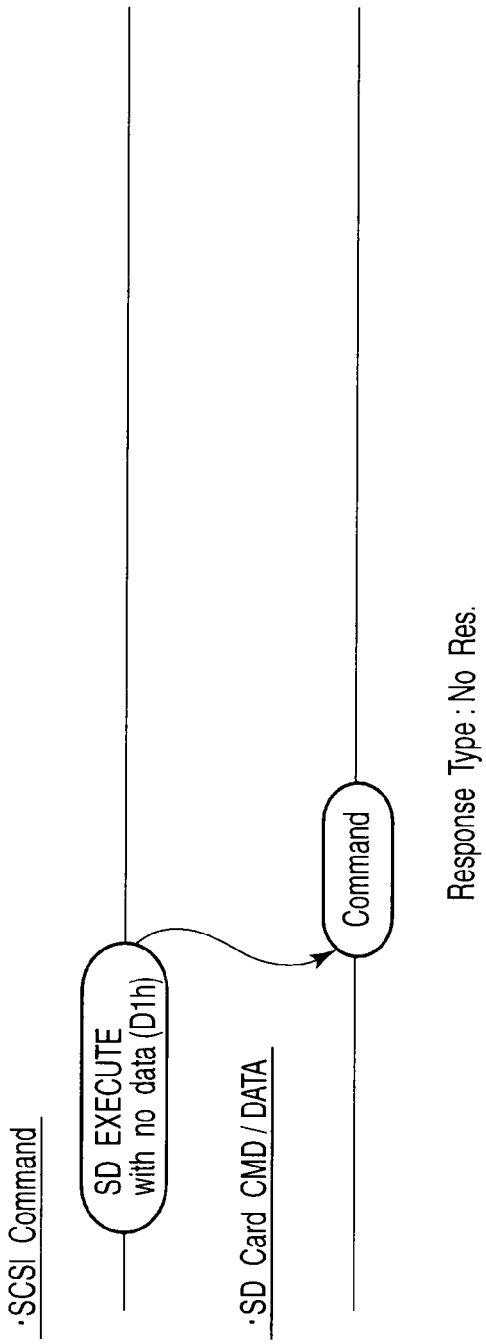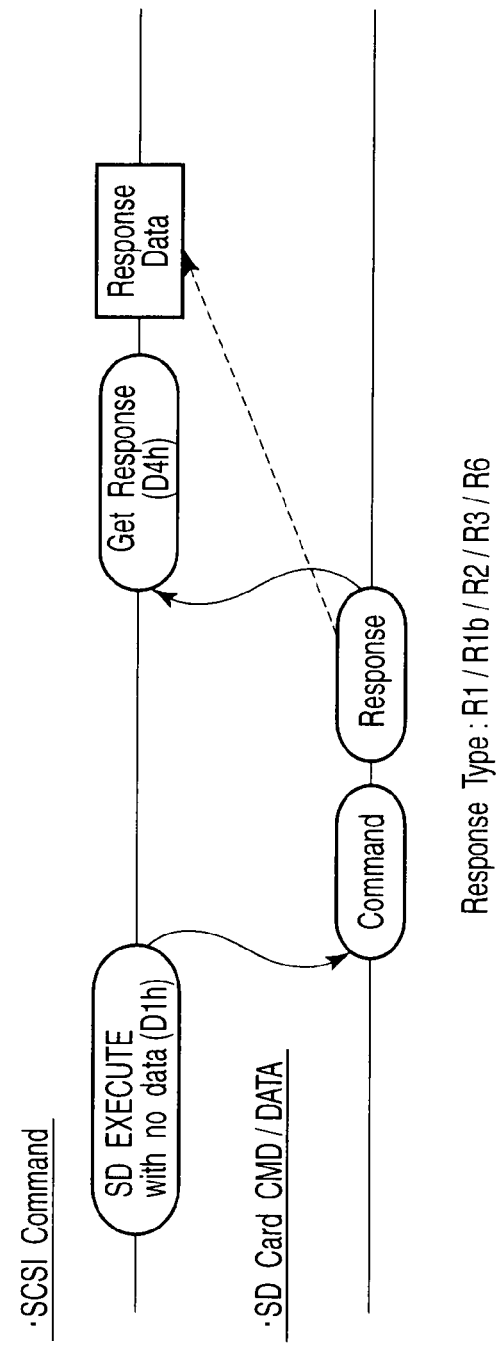
FIG. 14A
FIG. 14B

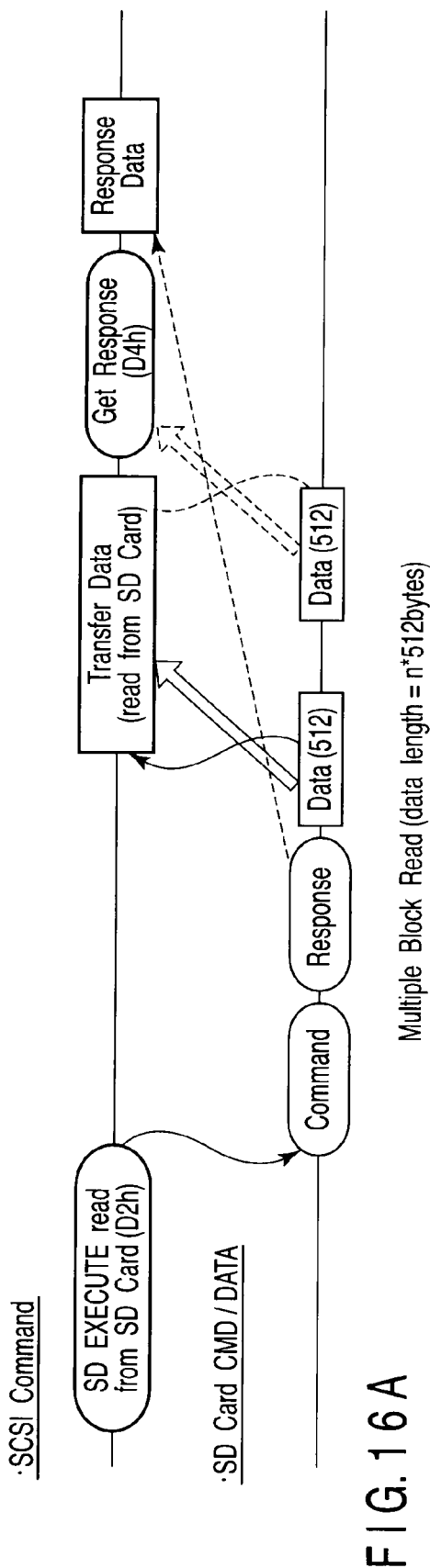
F I G. 16 A
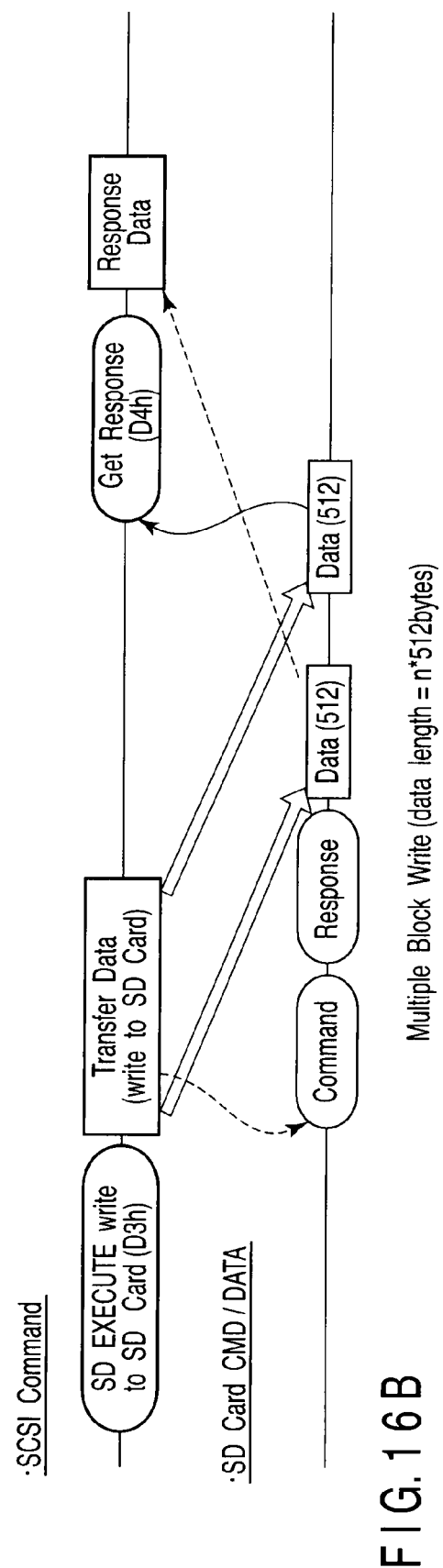
F I G. 16 B

←——→ : Read / write command / response / data for normal region of memory
←---→ : Command / response / data for pass through mode

SEMICONDUCTOR DEVICE WITH A FIRST INTERFACE TO CONNECT TO A MEMORY CARD HAVING A LOCK AND UNLOCK STATE AND A SECOND INTERFACE TO CONNECT TO A HOST DEVICE AND MEMORY CARD INTIALIZATION METHOD

CROSS-REFERENCE TO RELATED APPLICATIONS

This application is based upon and claims the benefit of priority from prior Japanese Patent Application No. 2007-215984, filed Aug. 22, 2007, the entire contents of which are incorporated herein by reference.

BACKGROUND OF THE INVENTION

1. Field of the Invention

The present invention relates to a semiconductor device connectable to a memory card and a memory card initialization method.

2. Description of the Related Art

In recent years, a memory card has been well known as a removable recording medium for use in a personal computer (PC) and the like. The memory card has been disclosed in, for example, Japanese Patent Application Laid-Open No. 2002-74277. As the memory card, for example, the SD™ card has been widely used. The SD™ card has a lock/unlock function which blocks recorded confidential information from being read out by unrelated persons, for security. The SD™ card in a lock state only receives a limited part of commands so as to prohibit normal access for data read, write and erase.

To access the SD™ card, a reader/writer device for the SD™ card is needed. Conventionally, when the SD™ card is inserted into the reader/writer, the reader/writer issues an initialization command for the SD™ card. However, if the SD™ card is in lock state, sometimes the initialization command sequence is not terminated normally. Then, the reader/writer determines that that SD™ card is unavailable. As a result, there is a problem that command accesses, including an unlock command, to the SD™ card are impossible.

BRIEF SUMMARY OF THE INVENTION

A semiconductor device according to an aspect of the present invention includes:

a first interface which is capable of being connected to a memory card and communicating with the memory card, the memory card having a nonvolatile semiconductor memory and having an unlock state and a lock state, the memory card in the unlock state permitting an access to the nonvolatile semiconductor memory, the memory card in the lock state prohibiting the access;

a second interface which is capable of being connected to a host device and communicating with the host device, the host device generating an access command to access the memory card; and a control unit which, when the memory card is connected to the first interface, operates based on the access command sent from the host device through the second interface so as to release the lock state of the memory card.

A memory card initialization method, the memory card having a nonvolatile semiconductor memory and having an unlock state which permits an access to the nonvolatile semiconductor memory and a lock state which prohibits the access, according to an aspect of the present invention includes:

initializing the memory card using a first command which the memory card in the lock state is capable of recognizing;

when the initialization using the first command succeeds, determining whether the memory card is in the lock state or in the unlock state;

when it is determined that the memory card is in the unlock state, initializing the memory card using a second command which the memory card in the unlock state is capable of recognizing and the memory card in the lock state is incapable of recognizing; and when it is determined that the memory card is in the lock state or the initialization using the second command succeeds, notifying the host device that the memory card has been recognized.

BRIEF DESCRIPTION OF THE SEVERAL VIEWS OF THE DRAWING

FIG. 8 is a diagram showing the relation between the extension SCSI command and operation code in the memory system according to the second embodiment;

FIG. 9 is a diagram showing the format of a pass-through mode set command according to the second embodiment;

FIG. 10 is a diagram showing the format of a response according to the second embodiment;

FIG. 11 is a diagram showing the format of a card execution command according to the second embodiment;

FIG. 12 is a diagram showing the format of a response acquisition command according to the second embodiment;

FIG. 13 is a diagram showing the format of a hardware reset command according to the second embodiment;

FIG. 14A, FIG. 14B, FIG. 15A, FIG. 15B, FIG. 16A and FIG. 16B are timing charts of an SCSI command and an SD card command according to the second embodiment;

DETAILED DESCRIPTION OF THE INVENTION

First Embodiment

Figure 1:
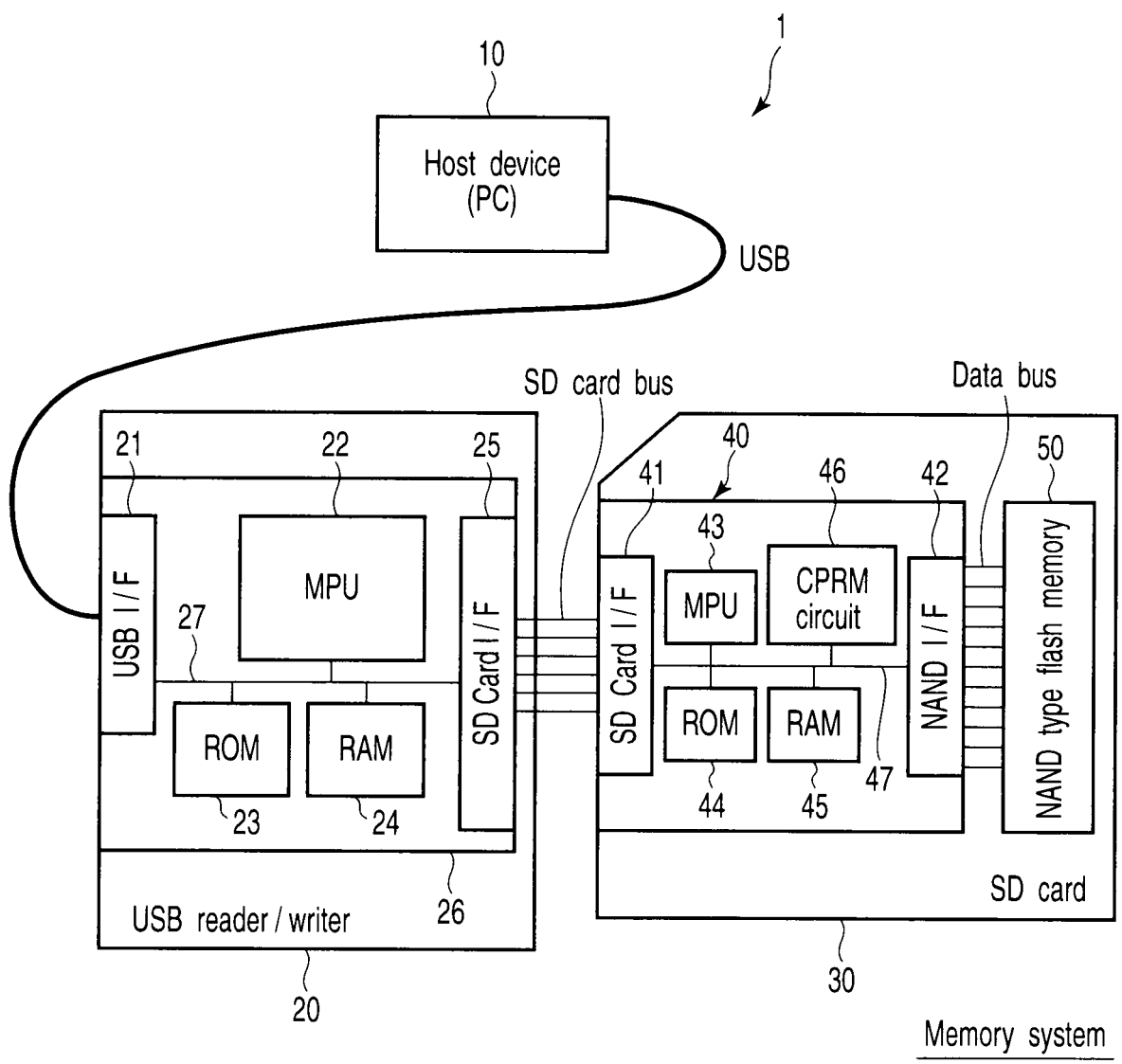
FIG. 1 is a block diagram of a memory system according to a first embodiment of the present invention.

A semiconductor device according to the first embodiment of the present invention will be described with reference to FIG. 1. FIG. 1 is a block diagram of the memory system according to this embodiment.

As shown in FIG. 1, a memory system 1 includes a host device 10, universal serial bus (USB) reader/writer 20 and SD™ card 30.

The host device 10 accesses the SD™ card 30 through the USB reader/writer 20 so as to instruct, for example, data write, read and erase. The host device 10 is, for example, a personal computer (PC), digital camera, or mobile phone. In this embodiment, a case where it is a PC will be described.

The USB reader/writer 20 includes a USB interface 21, micro processing unit (MPU) 22, read only memory (ROM) 23, random access memory (RAM) 24 and SD™ card interface 25. These are formed on an identical semiconductor substrate 26 such that they can communicate with each other through an internal bus 27. The USB interface 21 can be connected to the host device 10 through the USB so as to control communication with the host device 10. The USB reader/writer 20 has a card slot (not shown), and the SD™ card interface 25 is connected to an SD™ card 30 inserted into a card slot by SD™ card bus and controls communication with the SD™ card 30. The MPU 22 processes a command received from the host device 10 and data received from the SD™ card, using the ROM 23 and RAM 24. The MPU 22 initializes the SD™ card 30 when the SD™ card 30 is inserted into the card slot. The initialization process will be described in detail later.

Next, the structure of the SD™ card 30 will be described. The SD™ card 30 includes mainly an SD™ card controller 40 and NAND type flash memory 50. The SD™ card controller 40 includes an SD™ card interface 41, NAND interface 42, MPU 43, ROM 44, RAM 45, and copy protection for prerecorded media (CPRM) circuit 46. These are formed on an identical semiconductor substrate and connected such that they can communicate with one another through an internal bus 47.

The SD™ card interface 41 can be connected to the SD™ card interface 25 of the USB reader/writer 20 through the SD™ card bus so as to control communication with the USB reader/writer 20. The NAND interface 42 is connected to the NAND type flash memory 50 through a data bus so as to control communication with the NAND type flash memory 50.

The MPU 43 controls the entire operation of the SD™ card 30. The MPU 43 executes processing (write, read, erase or data transfer) requested by the host device (USB reader/writer 20) using firmware stored in the ROM 44 and part of firmware stored in the RAM 45 and various tables.

The ROM 44 stores a control program to be controlled by the MPU 43. The RAM 45 is used as a work area for the MPU 43 and holds the control programs and various tables.

The CPRM circuit 46 controls copyright protection function of the SD™ card 30. That is, when the host device 10 accesses to secret information stored in the NAND type flash memory 50, the CPRM circuit 46 determines whether or not such access is permitted.

Figure 2:
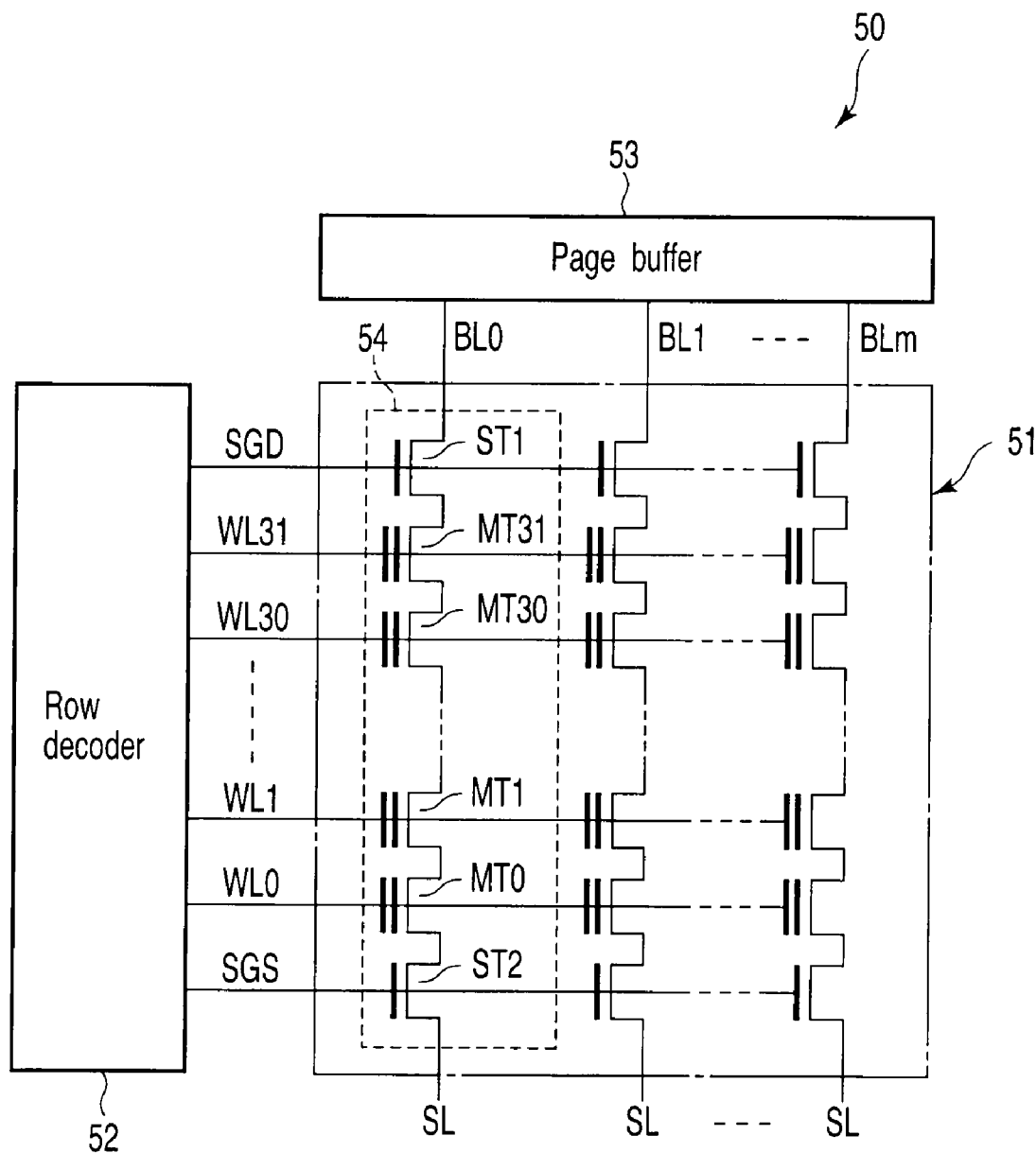
FIG. 2 is a block diagram of a NAND type flash memory according to the first embodiment.

Next, the internal structure of the NAND type flash memory 50 will be described briefly. FIG. 2 is a block diagram showing part of the region of the NAND type flash memory 50. As shown in the same Figure, the NAND type flash memory 50 includes a memory cell array 51, row decoder 52 and page buffer 53.

The memory cell array 51 has plural NAND cells 54. Each of the NAND cells 54 has, for example, 32 memory cell transistors MT0 to MT31 and selection transistors ST1, ST2. Hereinafter, if the memory cell transistors MT0 to MT31 are not classified, they are simply called memory cell transistors MT. The memory cell transistors MT are arranged so that the current path is connected in series between the drain of the selection transistor ST2 and the source of the selection transistor ST1. Each of the memory cell transistors MT has a stacked gate including a charge accumulation layer (for example, floating gate) formed on the semiconductor substrate with a gate insulating film, and a control gate formed on the charge accumulation layer with an inter-gate insulating film.

The sources of the selection transistors ST2 are connected to the source line SL in common and the drains of the selection transistor ST1 are connected to any one of bit lines BL0 to BLm (m is a natural number). Hereinafter, if the bit lines BL0 to BLm are not classified, they are simply called bit lines BL. Further, control gates of the memory cell transistors MT0 to MT31 within an identical memory block BLK are connected to word lines WL0 to WL31, respectively. The gates of the selection transistors ST1, ST2 are connected to select gate lines SGD, SGS, respectively.

With the above described structure, data is collectively written into (m+1) memory cell transistors MT connected to any one of the word lines WL. Data unit collectively written is called "pages". Further, data is collectively erased from all the memory cell transistors MT within the memory cell array 51.

The row decoder 52 selects any one of the word lines WL within the memory cell array 51 according to a row address signal given from the SD™ card controller 40. Then, the row decoder applies a voltage to a selected word line WL at the time of writing and reading.

The page buffer 53 controls data input/output to/from the memory cell array 51 and holds data temporarily. The data input/output between the page buffer 53 and the memory cell array 51 is carried out in units of plural data, that is, in units of pages, as described previously.

The SD™ card 30 having the above-described structure has a lock/unlock function. That is, the SD™ card can be in two states, unlock and lock, and the MPU 43 permits access to the NAND type flash memory 50 in the unlock state and prohibits access to the NAND type flash memory 50 in the lock state. The state is changed according to an instruction from the host device 10. Then, according to an instruction from the host device 10, the MPU 43 holds information about which it should be in the lock state or in the unlock state, for example, in a specified register within the RAM 45.

Figure 3:
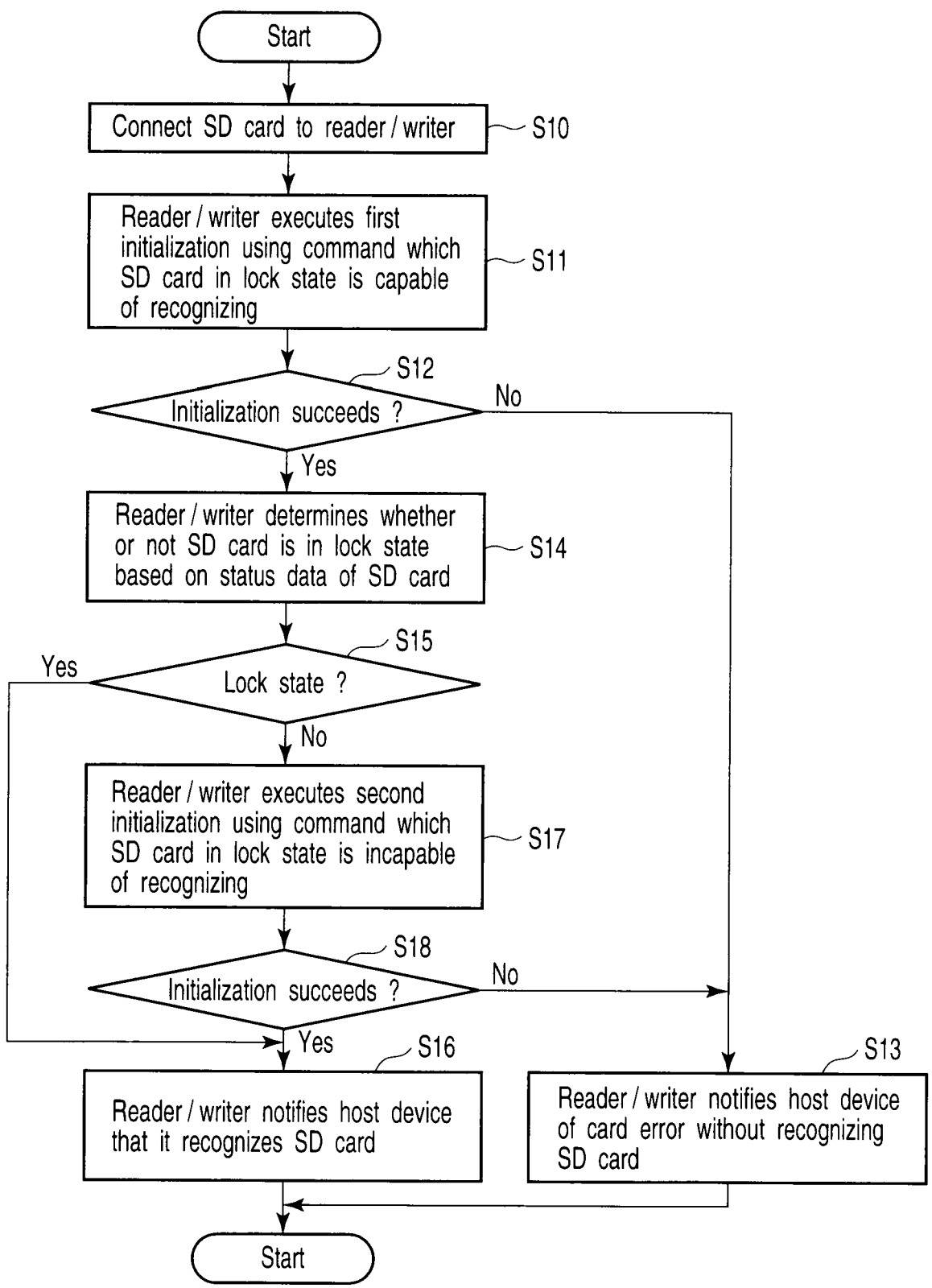
FIG. 3 is a flow chart showing a flow of processing of a USB reader/writer according to the first embodiment.

Next, the operation of the USB reader/writer 20 when the SD™ card 30 is inserted into the USB reader/writer 20 will be described with reference to FIG. 3. FIG. 3 is a flow chart showing the operation of the USB reader/writer 20.

As shown in the Figure, the SD™ card 30 is inserted into a card slot of the USB reader/writer 20. Consequently, the SD™ card interface 25 of the USB reader/writer 20 and the SD™ card interface 41 of the SD™ card 30 are connected through the SD™ card bus (step S10). As a result, the USB reader/writer 20 and the SD™ card 30 become able to communicate with each other.

Next, the MPU 22 of the USB reader/writer 20 executes first initialization of the inserted SD™ card 30 (step S11). The first initialization is initialization process of the SD™ card 30 by using only an acceptable command even if it is the SD™ card 30 in the lock state. The command which the SD™ card 30 in the lock state can accept is, for example, CMD0, CMD2, CMD3, CMD7, CMD9, CMD10 and ACMD41. That is, the MPU 22 reads out the first initialization program from the ROM 23 and executes the first initialization using the aforementioned command held in the ROM 23.

If initialization fails in step S11 (step S12, NO), the USB reader/writer 20 does not recognize the SD™ card 30 and the MPU 22 notifies the host device 10 of a card error from the USB interface 21 through the USB (step S13). As a result, the host device 10 recognizes that the SD™ card 30 is an unusable card and determines that an illegal card has been inserted into the USB reader/writer 20. After that, access to that card becomes impossible.

If initialization succeeds in step S11 (step S14, YES), the MPU 22 reads out status data from the SD™ card 30 and determines whether or not the SD™ card 30 is in the lock state (step S15). That is, if the first initialization has been succeeded, the SD™ card 30 turns into a state in which a state (lock state or unlock state) can be read by the USB reader/writer 20.

If it is determined that the SD™ card 30 is in the lock state in step S14 (step S15, YES), the MPU 22 terminates the initialization process of the SD™ card 30 at this time. Then, the MPU 22 notifies the host device 10 of information having the meaning that the SD™ card 30 is recognized from the USB interface 21 through the USB (step S16). After that, the host device 10 becomes accessible to the SD™ card 30. However, because the SD™ card 30 is in the lock state, data write, read and erase are prohibited and to access this, the SD™ card 30 needs to be transited from the lock state to the unlock state.

If it is determined that the SD™ card 30 is in the unlock state in step S14 (step S15, NO), the MPU 22 executes the second initialization of the SD™ card 30 (step S17). The second initialization refers to an initialization process which a command which cannot accept the SD™ card 30 in the lock state and can accept only the SD™ card 30 in the unlock state uses. An example of this command is ACMD6 and the like.

If the second initialization fails (step S18, NO), the MPU 22 regards the SD™ card 30 as illegal and proceeds to processing of step S13. If the second initialization succeeds (step S18, YES), as a result of the second initialization, the MPU 22 turns into a state capable of issuing an ordinary memory access command to the SD™ card 30. That is, data write, read and erase to the SD™ card 30 are enabled. Then, the MPU 22 proceeds to processing of step S16.

As described above, the USB reader/writer 20 of this embodiment can recognize the memory card in the lock state. This effect will be described below. If the SD™ card 30 is inserted, the conventional USB reader/writer automatically issues a series of initialization commands necessary for enabling data write/read to that card as described in the description of the related art. However, because the SD™ card 30 in the lock state cannot accept some initialization command, the initialization command sequence is sometimes not terminated normally. In this case, the conventional USB reader/writer determines that the SD™ card is unusable. That is, even if a normal SD™ card is inserted, it is recognized as an illegal card only for the reason that it is in the lock state, and after that any access containing an unlock command is disabled, which is a problem of the conventional art.

However, the USB reader/writer 20 of this embodiment the first initialization using commands which is acceptable by the SD™ card in the lock state. The first initialization turns the SD™ card into a state which allows its status to be read out. Then, when the first initialization succeeds, the MPU 22 grasps whether or not the SD™ card 30 is in the lock state. If the SD™ card 30 is in the lock state, the host device 10 is notified that the SD™ card 30 is a normal card at the time and the initialization process is terminated. Thus, even if the SD™ card 30 inserted into the USB reader/writer 20 is in the lock state, it is never determined to be a card error only for that reason. Thus, user can use the SD™ card 30 more easily.

In the above-described embodiments, specific commands (CMD0, CMD2, CMD3, CMD7, CMD9, CMD10, ACMD6 and ACMD41 and the like) for use in the SD™ card have been described as an example. However, this embodiment is not limited to use of the aforementioned command as long as the first initialization can turn the SD™ card into a state which allows its status (lock state or unlock state) to be read out and the second initialization allows the SD™ card to access the memory. A specific example of the initialization using the aforementioned command will be described later.

Second Embodiment

Next, the semiconductor device according to the second embodiment of the present invention will be described. This embodiment is related to a method for turning the SD™ card in the lock state into the unlock state according to the first embodiment.

A USB terminal is provided in an electronic device (host device) such as PC and used for connecting various peripherals (called targets) to the host using a high-speed serial communication. Currently, a removable recording medium such as a nonvolatile semiconductor memory can be connected to the host as a target using this USB terminal. Under the USB standard, a recording medium which enables data read/write directly through the USB terminal between the target and the host is one of the USB mass storage class.

A recording medium corresponding to the standard of the USB mass storage class achieves data write and read by exchanging a command and data described according to, for example, the small computer system interface (SCSI) standard format with the host by using bulk transfer of the USB interface. Hereinafter, commands described according to the SCSI standard format are called SCSI commands.

That is, if the SCSI command of a format corresponding to the USB communication protocol is given from the host device 10 to the reader/writer 20, the USB reader/writer 20 converts this SCSI command to an SD™ card command of the format corresponding to the SD™ card communication protocol and outputs such command to the SD™ card 30. Example of SCSI command is an SCSI block device command, and an AT attachment (ATA) block read/write command is particularly well known.

However, the conventional SCSI command only provides an access means for accessing ordinary user data in the recording medium to write or read the data from the host directly. That is, the conventional SCSI command provides no access means for the lock/unlock function of the SD™ card 30.

Thus, this embodiment provides a dedicated operating mode to a recording medium corresponding to the USB mass storage class standard, for example, the USB reader/writer 20 corresponding to the USB mass storage class standard, in order to provide an access means for the lock/unlock function of the SD™ card 30. The term dedicated operating mode refers to an operating mode which allows a command and data sent from the host to pass through the USB reader/writer 20 and directly to the SD™ card controller 40 of the SD™ card 30. Hereinafter, the dedicated operating mode is called "pass-through mode" and other operating mode is called normal operating mode. Further, to enable the pass-through mode, a novel command is prepared in this example. This novel command is called an extension SCSI command hereinafter, which will be described in more detail later.

Figure 4:
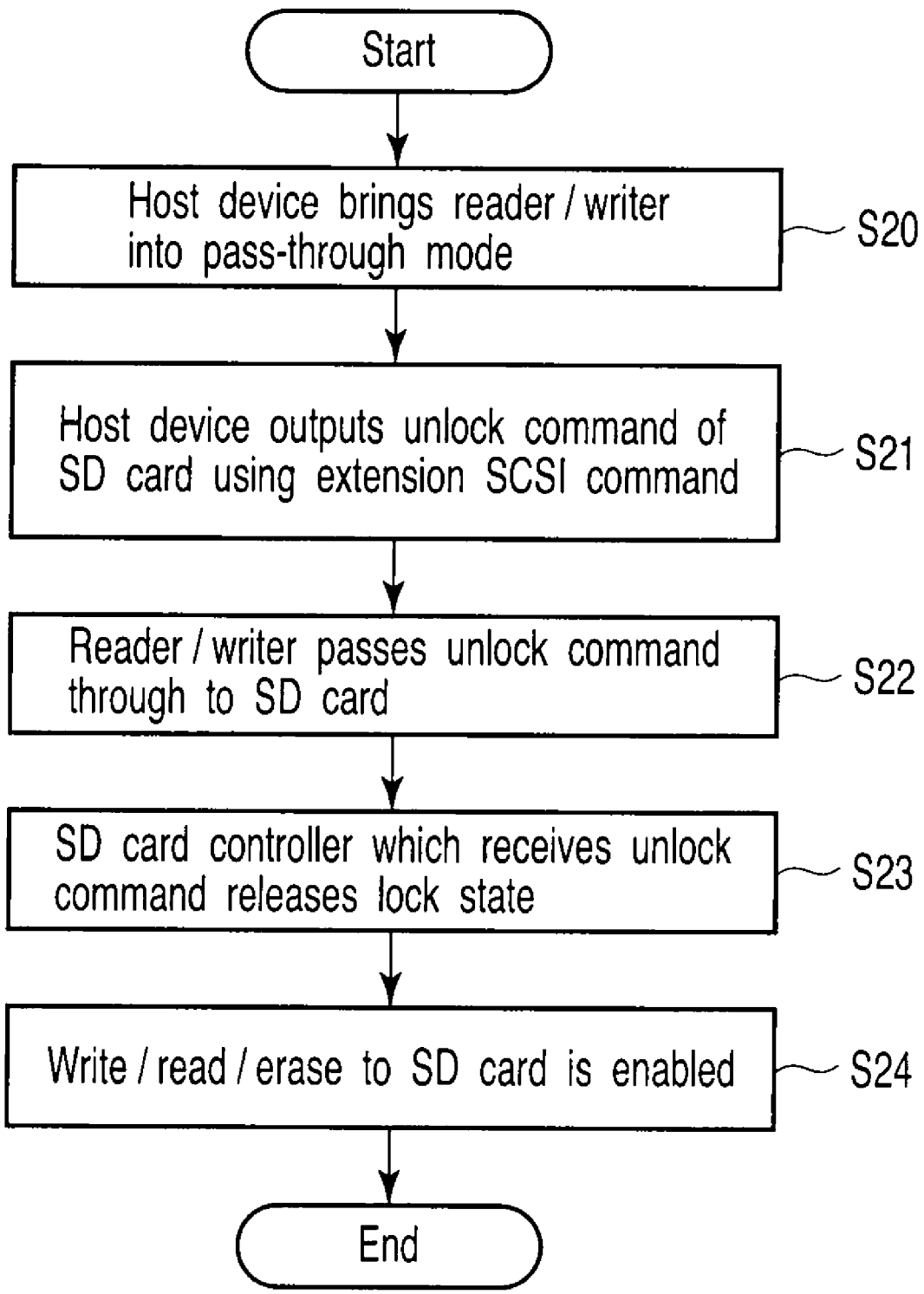
FIG. 4 is a flow chart showing a flow of processing of a memory system according to a second embodiment of the present invention.

First, an operation for changing the SD™ card 30 from the lock state to the unlock state using the pass-through mode will be described with reference to FIG. 4. FIG. 4 is a flow chart showing a flow of processing in the host device 10, the USB reader/writer 20 and SD™ card 30.

To change the SD™ card 30 in the lock state into the unlock state as shown in the Figure, the host device 10 turns the USB reader/writer 20 into the pass-through mode using the extension SCSI command (step S20).

After the USB reader/writer 20 is turned into the pass-through mode, the host device 10 outputs an unlock command to the USB reader/writer 20 using the extension SCSI command (step S21). The term unlock command refers to an instruction for changing the SD™ card 30 into the unlock state. At this time, the unlock command with a format according to the SD™ card command is output to the USB reader/writer 20 such that it is buried in the extension SCSI command.

Then, the USB reader/writer 20 which receives the SCSI command output in step S21 passes the unlock command buried in this SCSI command to the SD™ card 30 as-is (SD™ card command) (step S22). That is, the processing of converting a received SCSI command to the SD™ card command, which is performed in the normal operating mode, is not carried out.

Then, the SD™ card controller 40 which receives the unlock command is released from the lock state and turned into the unlock state (step S23). Consequently, ordinary access for write, read and erase to the SD™ card 30 is enabled after that (step S24).

FIG. 4 shows a case of transition from the lock state to the unlock state, and the same method can be applied for transition from the unlock state to the lock state. That is, after the USB reader/writer 20 is changed to the pass-through mode in step S20, the host device 10 outputs the lock command buried in the extension SCSI command. Then, USB reader/writer 20 passes the lock command through and outputs to the SD™ card 30. Consequently, the SD™ card controller 40 is turned to the lock state.

Figure 5:
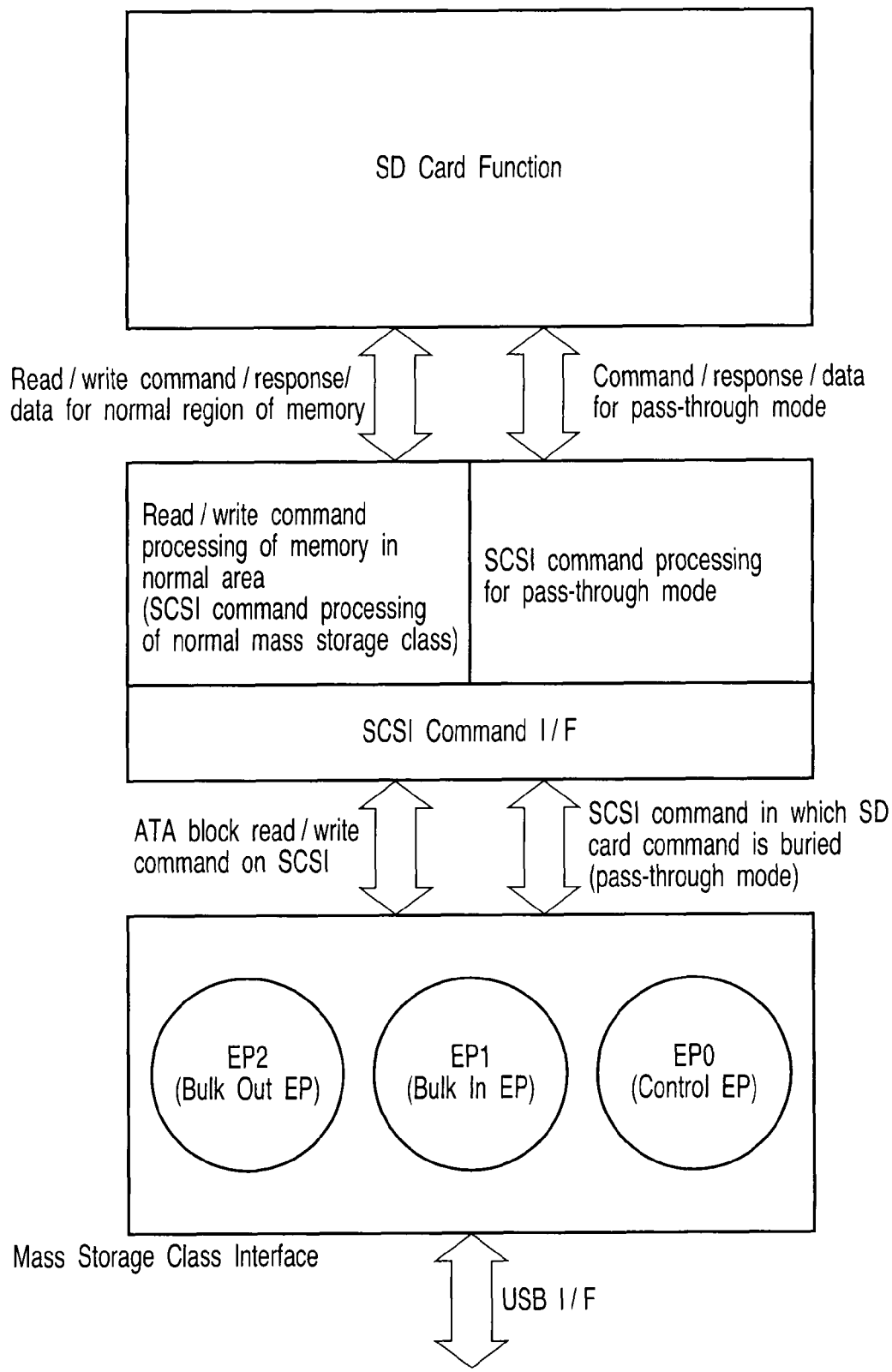
FIG. 5 is a diagram showing an example of a logic interface of the USB reader/writer according to the second embodiment.

Next, a logic interface for achieving the aforementioned pass-through mode will be described. FIG. 5 is a diagram showing an example of the logic interface of the memory system 1 of this embodiment. The logic interface shown in FIG. 5 is defined in not the host device 10 but the communication interface loaded on the USB reader/writer 20.

If as shown in FIG. 5, the USB reader/writer 20 of this embodiment is connected to the USB terminal of the host device 10, an end point (EP) is recognized as the mass storage class interface within the communication interface, as in an ordinary USB device. In this example, three end points EP0 to EP2 are prepared for the mass storage class interface. The term "end point" refers to a theoretical minimum unit of communication passage for connecting between the USB reader/writer 20 and the host device and is specified by the USB standard.

The end point EP0 is a control end point (control EP). That is, the end point EP0 is used for control of the USB device in, for example, configuration of the USB device, and can execute only control transfer.

Contrary to this, transfer of the SCSI command, data and response is all carried out using the end points EP1, EP2 to enable bulk transfer. Of them, the end point EP1 is an end point for downstream (bulk in EP). Data and SCSI commands transferred from the host device 10 to the USB reader/writer 20 are sent by bulk transfer and set to the end point EP1. The end point EP2 is end point for upstream (bulk out EP), in which for example, data transferred from the USB reader/writer 20 to the host device 10 is set.

As the SCSI command of this example, as well as ordinary commands for use in the USB reader/writer 20, for example, the aforementioned ATA block read/write command, the dedicated command for pass-through mode is defined as an extension command of the SCSI command. As described above, one of the extension SCSI commands of this example is the SCSI command in which the SD™ card command is buried. The buried SD™ card command is a lock command or unlock command. As well as the lock command and unlock command, a command for enabling the copyright protection function not supported by the conventional SCSI command and an access command for a security area in which confidential information can be stored in the NAND type flash memory 50 may be buried.

Figure 6:
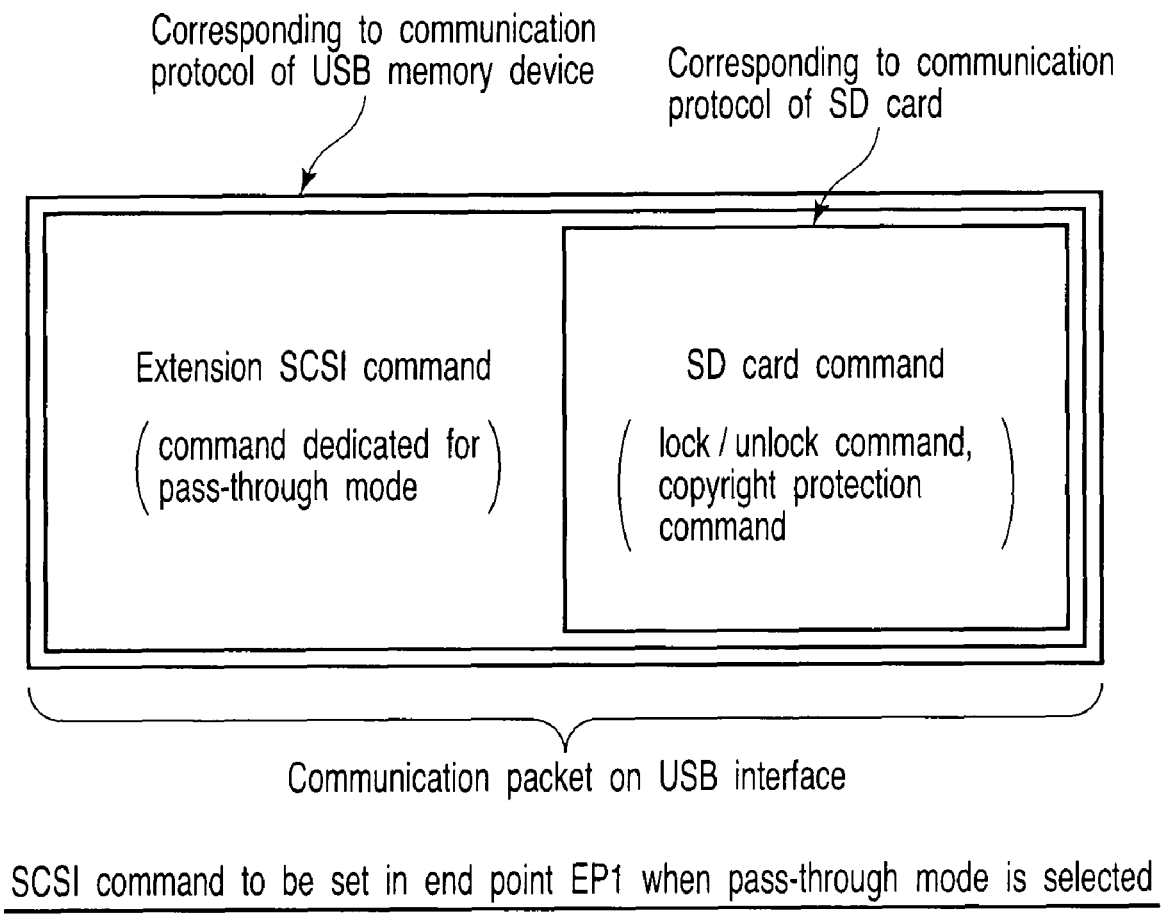
FIG. 6 is a conceptual diagram showing the structure of a command output from the host device in the memory system according to the second embodiment.

FIG. 6 shows an example of the extension SCSI command which is set in the end point EP1. In this example, in a communication packet on the USB interface 21, the extension SCSI command (dedicated command for pass-through mode) and a command (lock command, unlock command, copyright protection command and the like) buried in this communication packet are written and the communication packet in which these are written is set in the end point EP1. The communication packet corresponds to a USB communication protocol. The extension SCSI command is described according to the SCSI format and can be read by the MPU 22 of the USB reader/writer 20. The buried command (SD™ card command) corresponds to a communication protocol different from the USB communication protocol, in this example, the communication protocol of the SD™ card 30. The buried command is readable by the SD™ card controller 40.

When the MPU 22 of the USB reader/writer 20 reads an extension SCSI command to enable the pass-through mode, the USB reader/writer 20 enables the pass-through mode. If the pass-through mode is enabled, exchange of command, data and response is enabled under the pass-through mode, so that the SD™ command buried in the extension command of the pass-through mode is passed through the USB reader/writer 20 and sent to the SD™ card controller 40.

When the MPU 43 of the SD™ card controller 40 reads the lock command or unlock command (SD™ card command) passed through, the MPU 43 activates the lock/unlock function so that the lock state or the unlock state is attained corresponding to a command. Further, if the SD™ card command passed through is a copyright protection command, the MPU 43 activates the copyright protection function, so that the CPRM circuit 46 is accessed. Under the pass-through mode, not only commands but also data pass through the USB reader/writer 20. That is, data which should be written into the security area of the NAND type flash memory 50 and data read out from the security area pass through the USB reader/writer 20.

Hereinafter, a further detailed example of the above operation will be described with reference to FIG. 5. As shown in the Figure, the SCSI command and data (downstream data) set in the end point EP1 are transferred from the mass storage class interface to the SCSI command interface (SCSI command I/F). Data (upstream data) and a response from the USB reader/writer 20 are set in the end point EP2 from SD™ card 30 through the SCSI command interface.

If the SCSI command set in the end point EP1 is an ordinary command, for example, an ATA block read/write command, the SCSI command interface executes SCSI command processing of the ordinary mass storage class. That is, the MPU 22 of the USB reader/writer 20 converts the command and data described according to the SCSI standard format to the command (SD™ card command) and data which can access the memory region of the SD™ card 30.

If the ordinary SCSI command is set in the end point EP1, the USB reader/writer 20 is activated according to an ordinary SCSI command, as in an ordinary USB device.

If the SCSI command set in the end point EP1 is an extension command, for example, a dedicated command for pass-through mode, the SCSI command interface executes the SCSI command processing for pass-through mode. That is, the MPU 22 pulls out the SD™ card command from the SCSI command and transfers this to the SD™ card controller 40. Consequently, the SD™ card controller 40 can activate the lock/unlock function. Further, the access to the function, for example the copyright protection function, which is supported by the SD™ card and is not supported by the conventional USB is enabled.

Figure 7:
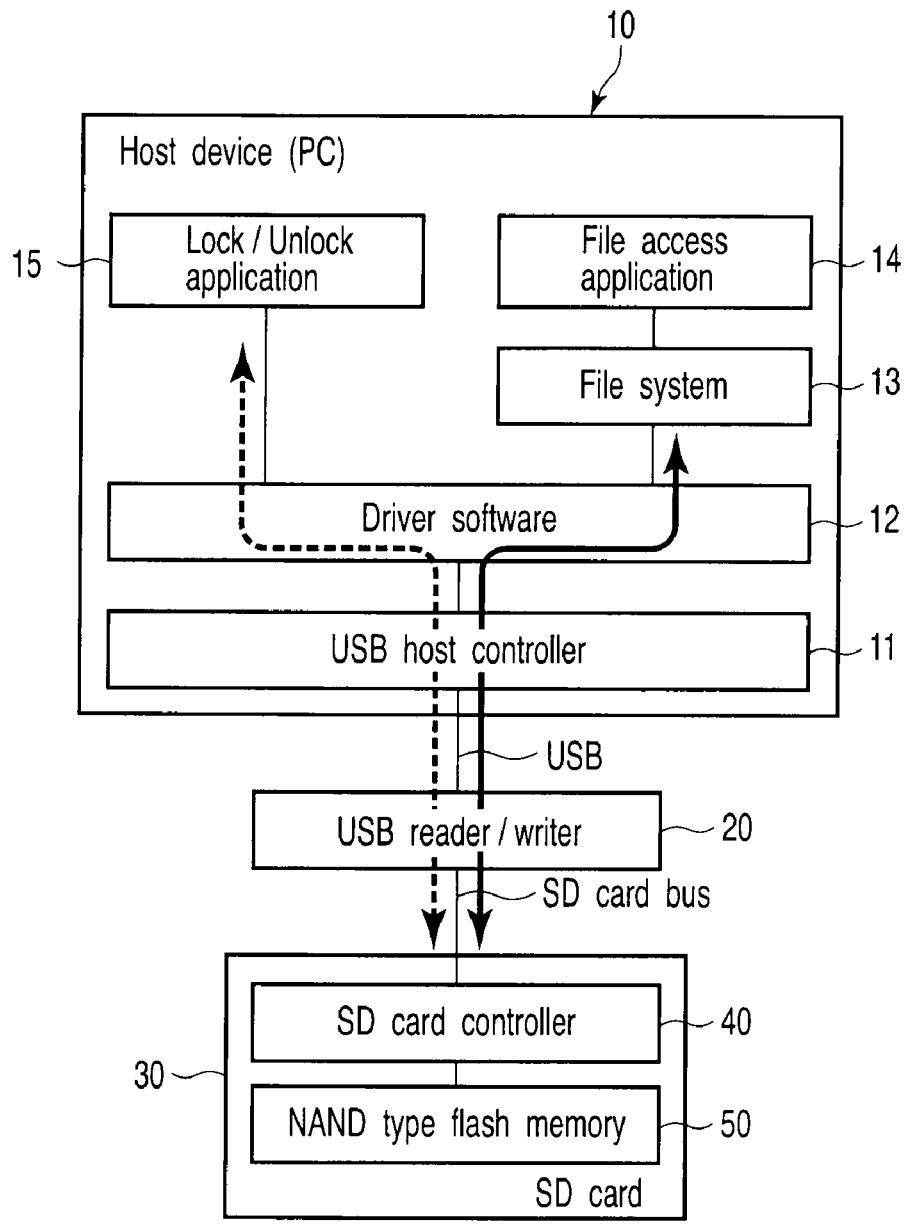
FIG. 7 is a block diagram showing the logic structure of a memory system according to the second embodiment.

FIG. 7 is a conceptual diagram showing the logic configuration of the memory system 1 of this embodiment. According to the first embodiment, if the initialization is completed by the processing described in FIG. 3 so that the SD™ card 30 is recognized, the host device 10 makes access to the SD™ card 30. In the Figure, the solid line indicates a flow of access in the normal operating mode. That is, this is a flow of access to the SD™ card 30 in the unlock state. Further, the dotted line indicates a flow of access to the lock/unlock function under the pass-through mode. That is, it is a flow of access to the SD™ card 30 in the lock state.

As shown in the FIG. 7, for the SD™ card 30 in the unlock state, a file access command is issued from a software application 14 on the host device 10 to a file system software 13. In correspondence to this command, the file system software 13 accesses the USB reader/writer 20 through the driver software 12 and USB host controller 11 according to the standard command (SCSI command) of the mass storage class. That is, data write, read and erase are carried out to the normal memory area of the NAND type flash memory 50. The lock/unlock application 15 on the host device 10 can issue a lock command to turn the SD™ card 30 into the lock state using the pass-through mode. Using the pass-through mode enables the security area of the NAND type flash memory 50 to be accessed from the application software 14.

Even if a file access command is issued to the SD™ card 30 in the lock state from the application software 14 like in the unlock state, actual file access is disabled so that an error is only sent back from the SD™ card 30. However, by using the pass-through mode, the lock/unlock application 15 can issue the unlock command so as to turn the SD™ card 30 into the unlock state.

Next, the extension SCSI command as the dedicated command for pass-through mode will be described. Such a command can be obtained by defining a vendor unique command based on for example, the SCSI protocol. The USB reader/writer 20 enables the pass-through operation by supporting the vendor unique command. FIG. 8 is a table showing the relation between the extension SCSI commands and corresponding operation codes.

As shown in the Figure, under the extension SCSI command in the memory system 1 of this embodiment, the following seven codes (command code) are defined.

(1) Pass-through mode set command (SD™ Card Pass-through Mode)
Operation code "D0h"
(2) SD™ card execution command with no-data (SD™ Execute (No Data))
Operation code "D1h"
(3) SD™ card execution command with read data (SD™ Execute (read from SD™ Card))
Operation code "D2h"
(4) SD™ card execution command with write data (SD™ Execute (write to SD™ Card))
Operation code "D3h"
(5) Response acquisition command (Get Response)
Operation code "D4h"
(6) Reservation command (Reserved)
Operation code "D5h"
(7) Hardware reset command (SD™ Hardware Reset)
Operation code "D6h"

In the meantime, in this embodiment, "h" after a numeral indicates that the numeral is hexadecimal. Therefore, the aforementioned operation code "D0h" is "1101_0000" if it is expressed in binary.

Of the extension SCSI commands, the pass-through mode set command is a command for changing the USB reader/writer 20 from the normal operating mode to the pass-through mode. As the operation code, "D0h" is used and this "D0h" is given to the USB reader/writer 20 from the host device 10.

The SD™ card execution command with no-data, SD™ card execution command with read data and SD™ card execution command with write data are commands for accessing the SD™ card 30 without accompanying data or by accompanying data. As the operation code, "D1h", "D2h", "D3h" are used and those are given from the host device 10 to the USB reader/writer 20.

The reservation command is allocated to codes of illegal commands.

The hardware reset command is a command for initialization of the SD™ card and its firmware and as the operation code, "D6h" is used.

Next, an example of the format of each command will be described with reference to FIG. 9 to FIG. 13. FIG. 9 to FIG. 13 are conceptual diagrams showing the format of each command and each row of each diagram shows 1-byte data, while a numeral indicated on the abscissa axis indicates the bit position of each 1-byte data.

<Pass Through Mode Set Command>

FIG. 9 is a conceptual diagram showing an example of the format of the pass-through mode set command. When the USB reader/writer 20 is started, the pass-through mode is disabled. That is, the USB reader/writer is in the normal operating mode. In this case, when the USB reader/writer 20 receives a command codes other than the command code "D0h", the USB reader/writer 20 sends back "illegal command error". That is, USB reader/writer 20 does not recognize any extension command other than "D0h".

As shown in FIG. 9, "D0h" indicating the pass-through mode set command is set at a head byte (0 byte position) of the pass-through mode set command as an operation code. To disable the pass-through mode, "0000" ("0h") is set in the command mode and to enable the pass-through mode, "0001" ("1h") is set. If with the command mode set to "0001", the pass-through mode set command (code "D0h") is executed, the pass-through mode is changed from disable to enable in the USB reader/writer 20. As a result, the pass-through mode is enabled so that the USB reader/writer 20 becomes capable of executing codes "D1h" to "D6h". In FIG. 9, "LUN" indicates a logic drive for use and "Control Byte" is a predetermined value to be given to the command format.

<Response>

FIG. 10 shows an example of the format of the response. The response is a signal which is given from the SD™ card 30 corresponding to a response acquisition command and has a meaning of acknowledgement to a command. The relation between the response acquisition command and response will be described later.

The response is exchanged between the host device 10 and the USB reader/writer 20 according to the format shown in FIG. 10. In FIG. 10, "WP" indicates presence/absence of write protect and when WP="0", write is permitted, while when WP="1", write is prohibited. "Media type" indicates the type of media which sends back the response. When Media Type="0", it indicates that medium is not present and when Media Type="1", it indicates that the media is an SD™ card. When Media type="2", it indicates that the media is compatible with the SD™ card. When Media type="3", it indicates that the media is an illegal media which resembles an SD™ card. A relative card address (RCA) is held at the $6^{th}$ and $7^{th}$ byte. The RCA is a value which the SD™ card sets up itself at the time of initialization of the SD™ card and used as an input parameter for part of the SD™ card command. "Max LUN Number" indicates the number of logic drives.

<SD™ Card Execution Command>

FIG. 11 shows an example of the format of the SD™ card execution command with no-data, SD™ card execution command with read data and SD™ card execution command with write data. If these commands are not classified, they are called simply SD™ card execution commands.

The SD™ card execution command is a command which executes some processing by accessing the SD™ card actually. As described above, under the pass-through mode, the SD™ card command is buried in the extension SCSI command and transferred directly to the SD™ card controller. The SCSI command in which this SD™ card command is to be buried is the SD™ card execution command.

As shown in FIG. 11, an operation code is set at the first 0 byte position. If no data is required for accessing the SD™ card controller 40, as the no-data SD™ card execution command, "D1$h$" is set up. To access the SD™ card controller 40 for reading data, as the SD™ card execution command with read data, "D2$h$" is set up. To access the SD™ card controller 40 for writing data, as the SD™ card execution command with write data, "D3$h$" is set up.

"Send cmd12", "Standby" and "ACMD" are set at lower three bits in next 1 byte position. These are pieces of information indicating how to transfer the SD™ card command buried in the command to the SD™ card controller 40.

"Send cmd12" is information indicating whether a predetermined command cmd12 supported by the SD™ card 30 is to be executed in the SD™ card 30 in which execution of a command is completed. The command cmd12 is a command indicating that multi-block transfer to the SD™ card by the host device is ended. The block mentioned here is a group of memory cells which hold data in the NAND type flash memory 50 and data held by memory cells in the same block is collectively erased.

"Standby" is information indicating a request command to the SD™ card in the standby state.

"ACMD" indicates whether the request command is ACMD for a special purpose. The command for the special purpose is a command which accesses, for example, a lock/unlock function or copyright protection function. Thus, if the request command is a command for the special purpose, ACMD="1" and if it is a normal command, ACMD="0".

"RSV" in FIG. 11 is a reserved bit field for function enhancement in future.

Then, the SD™ card command is buried in the lower six bits of the $2^{nd}$ bit and $3^{rd}$ to $6^{th}$ bytes position. The SD™ card command contains "SD™ command index", which indicates the content of a command (read, write, and the like) and "SD™ Command Argument", which indicates information (address and the like) necessary for executing that command.

Data ("Data Transfer Length") required for execution of a command such as reading data and writing data are held at $7^{th}$ to $9^{th}$ bytes position. "Response type" indicates a response type to be sent to the SD™ card. As the response type, "R1", "R1$b$", "R2" to "R6" are prepared. The details of such will be given later. If "response type" is "0000_0011", no response is sent ("No Res") and if "0000_0100", "R1", "R4" to "R6" are selected. If "0000_0101", "R1$b$" is selected, if "0000_0110", "R2" is selected and if "0000_0111", "R3" is selected.

Therefore, when the host device 10 issues a lock command or unlock command, "D1$h$" in set as operation code and a lock command or unlock command with the SD™ card command format is buried in "SD™ Command Index" and "SD™ Command Argument" in the format shown in FIG. 11. To write data into the security area of the NAND type flash memory 50, "D3$h$" is set as the operation code in the format shown in FIG. 11. Further, a write command with the SD™ card command format is buried in the "SD™ Command Index" and "SD™ Command Argument" and data to be written is buried in "Data Transfer Length" in the format shown in FIG. 11.

<Hardware Reset Command>

FIG. 12 shows an example of the format of the hardware reset command.

As shown in FIG. 12, "D6$h$" is set at the first 0 byte position as an operation code.

<Response Acquisition Command>

FIG. 13 shows an example of the format of the response acquisition command.

As shown in FIG. 13, "D4$h$" is set at the first 0 byte position as the operation code.

Hereinafter, the relation between the response acquisition command and the response will be described. Under the pass-through mode, SD™ card command passes through the USB reader/writer 20 and is sent directly to the SD™ card controller 40. On the other hand, at an operation mode other than when the pass-through mode is selected, the SCSI command is converted to a command readable by the SD™ card controller 40 in the USB reader/writer 20 and sent into the SD™ card controller 40.

Some commands of the SD™ card 30 request for a response to a command, and other commands do not request a response. However, such an action is not expected under a normal SCSI command. Therefore, if a command which requests for a response is sent to the SD™ card 30, a response output from the SD™ card controller 40 is enclosed, for example, between the SD™ card controller 40 and the USB reader/writer 20. If the response is enclosed inside of the USB reader/writer 20, the action of the USB reader/writer 20 might be unstable or the USB reader/writer 20 might malfunction.

To eliminate such a fear, in this example, a response acquisition code (Get Response) is defined in one extension. Thus, the response acquisition code is defined in one of the extension commands and the defined response acquisition code is sent to the USB reader/writer 20. Consequently, a response output from the SD™ card controller 40 is never enclosed inside of the USB reader/writer 20, so that the response can be sent from the SD™ card controller 40 to the host device 10 through the USB reader/writer 20. Consequently, an advantage of eliminating one of the causes which make the operation of the USB reader/writer 20 unstable or the USB reader/writer 20 malfunction can be secured.

FIG. 14A is a view showing an example of command processing for a command which does not request the SD™ card for any response. As the type of the command which does not request for any response, addressed (point-to-point) commands (ac) and broadcast commands (bc) are available. The response type of these commands is "No Res". That is, in the format shown in FIG. 11, the "Response Type" is "0000_0011".

When the SD™ card execution command with no data (SD™ EXECUTE with no data: "D1h") with "No Res" is sent from the host device to the USB reader/writer 20 as shown in FIG. 14A, only that command is sent to the USB reader/writer 20. The MPU 22 of the USB reader/writer 20 which receives that command transfers the SD™ card command (Command) buried in the received SCSI command to the SD™ card controller 40. The processing is ended here.

On the other hand, as the type of a command which requests for a response, broadcast commands with response (bcr) is available. The response type of this command includes the aforementioned "R1", "R1b", "R2" to "R6" and the like. As for these response types, "R1" is a normal response, "R1b" is a normal response capable of optionally transferring a busy signal to a data line, "R2" is a response sent from a card identification number register (CID) or card specific data register (CSD) within the SD™ card controller 40, "R3" is a response sent from an operation conditions register (OCR) within the SD™ card controller 40, "R4" and "R5" are responses attached to an illegal media which resembles the SD™ card 30, and "R6" is a response sent form a relative card address register (RCA) within the SD™ card 30. In this specification, the response types "R1" to "R6" are generally called "With Res" and their details are omitted.

FIG. 14B is a diagram showing an example of command processing for a command which requests the SD™ card 30 for a response. Although the response types "R4" and "R5" are not shown because FIG. 14B shows an example of using the SD™ card 30 as a recording medium, the processing example for the response types "R4" and "R5" is the same as in FIG. 14B.

As shown in FIG. 14B, when the SD™ card execution command with no-data (SD™ EXECUTE with no data: "D1h") with the "With Res" is sent to the USB reader/writer 20 from the host device 10, a response acquisition command (Get Response: "D4h") is sent after that command is sent. The related processing example will be described.

The USB reader/writer 20 which receives the command ("D1h") with "With Res" transfers the SD™ card command (Command) buried in the received SCSI command to the SD™ card controller 40. After the MPU 43 of the SD™ card controller 40 executes a processing following the received SD™ card command, the MPU 43 sends back a response. To fetch this response from the USB reader/writer 20, the response acquisition command (Get Response: "D4h") is sent to the USB reader/writer 20 from the host device 10. The USB reader/writer 20 which receives the response acquisition command fetches the response returned from the SD™ card controller 40 following the received command and sends the fetched out response (Response Data) to the host device 10. The processing is ended here.

As a further command type, addressed (point-to-point) data transfer commands (adtc) is available. Specific examples of adtc are the SD™ card execution command with read data and SD™ card execution command with write data. Further, when the command type is adtc, a response is requested.

Figure 15A:
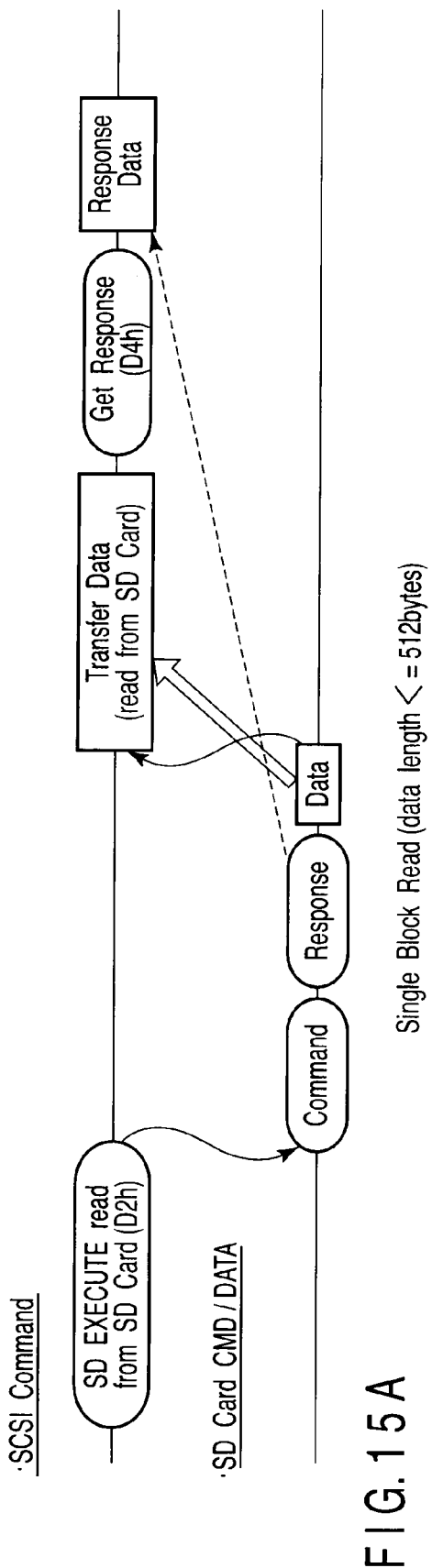

FIG. 15A is a diagram showing an example of command processing for the SD™ card execution command with read data (single block read). As shown in FIG. 15A, when the SD™ card execution command with read data (SD™ EXECUTE read from SD™ card: "D2h") is sent to the USB reader/writer 20 from the host device 10, the response acquisition command (Get Response: "D4h") is sent after that command is sent.

The USB reader/writer 20 which receives, for example, the SD™ card execution command with read data transfers the SD™ card command (Command) buried in the received SCSI command to the SD™ card controller 40. The MPU 43 of the SD™ card controller 40 executes data reading from the NAND type flash memory 50 following the received SD™ card command. After that, the MPU 43 of the SD™ card controller 40 sends back the response and sends data read from the NAND type flash memory 50 to the USB reader/writer 20. The MPU 22 of the USB reader/writer 20 sends the received data (Transfer Data (read from SD™ card)) to the host device 10. After sending of the received data is ended, the response acquisition command (Get Response: "D4h") is sent from the host device 10 to the USB reader/writer 20. The USB reader/writer 20 which receives the response acquisition command fetches out a response sent back from the SD™ card controller 40 following the received command, and the fetched out response (Response Data) is sent to the host device 10. The processing is ended here.

Figure 15B:
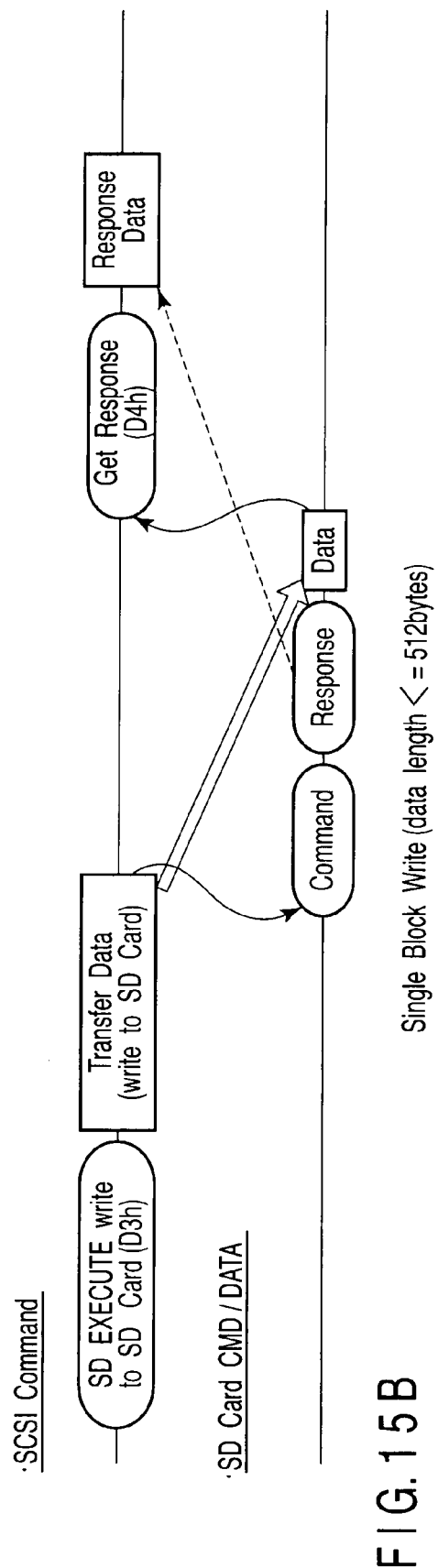

FIG. 15B is a diagram showing an example of command processing for the SD™ card execution command with write data (single block write). When the SD™ card execution command with write data (SD™ EXECUTE write to SD™ Card: "D3h") is sent to the USB reader/writer 20 from the host device 10 as shown in FIG. 15B, the response acquisition command (Get Response: "D4h") is sent after write data (Transfer Data(Write to SD™ Card)) subsequent to that command is sent.

For example, the MPU 22 of the USB reader/writer 20 which receives the SD™ card execution command with write data and write data transfers the SD™ card command (Command) buried in the received SCSI command and the write data (Data) to the SD™ card controller 40. The MPU 43 of the SD™ card controller 40 sends back the response and executes writing of the write data to the NAND type flash memory 50 following the received command. After the writing is ended, the USB reader/writer 20 sends the response acquisition command (Get Response: "D4h") to the SD™ card controller 40. The USB reader/writer 20 fetches out the response returned from the SD™ card controller 40 following the received command and sends the fetched out response (Response Data) to the host device 10. The processing is ended here.

FIG. 16A is a diagram showing an example of command processing for the SD™ card execution command with read data (multiple block read).

The processing example shown in FIG. 16A is different from the processing example shown in FIG. 15A in that the processing example shown in FIG. 15A is single block read while the processing example shown in FIG. 16A is multiple block read. In the single block read, the data length of read data is equal to or less than the block size of the SD™ card 30, and the data read is done in a single block. Contrary to this, in the multiple block read, the data length of read data exceeds the block size of the SD™ card 30 and the data read extends over plural blocks. This example indicates that the block size of the SD™ card 30 is 512 bytes. The multiple block read is different from the single block read in that the read data is transferred from the SD™ card controller 40 to the USB reader/writer 20 dividedly, i.e., not in one go, but is otherwise the same as in the single block read. The block mentioned here refers to an assembly of NAND cells 54 described with reference to FIG. 2 in the first embodiment, which serves as an erasing unit for data. That is, data held by the memory cell transistor MT in the same block is collectively erased.

FIG. 16B is a diagram showing an example of command processing for the SD™ card execution command with write data (multiple block write).

In the processing example shown in FIG. 16B, the processing example shown in FIG. 15B, which is single block write, is changed to multiple block write. This example is different from the processing example shown in FIG. 15B in that data write is of multiple block write, but is otherwise the same as in the single block write.

Figure 17:
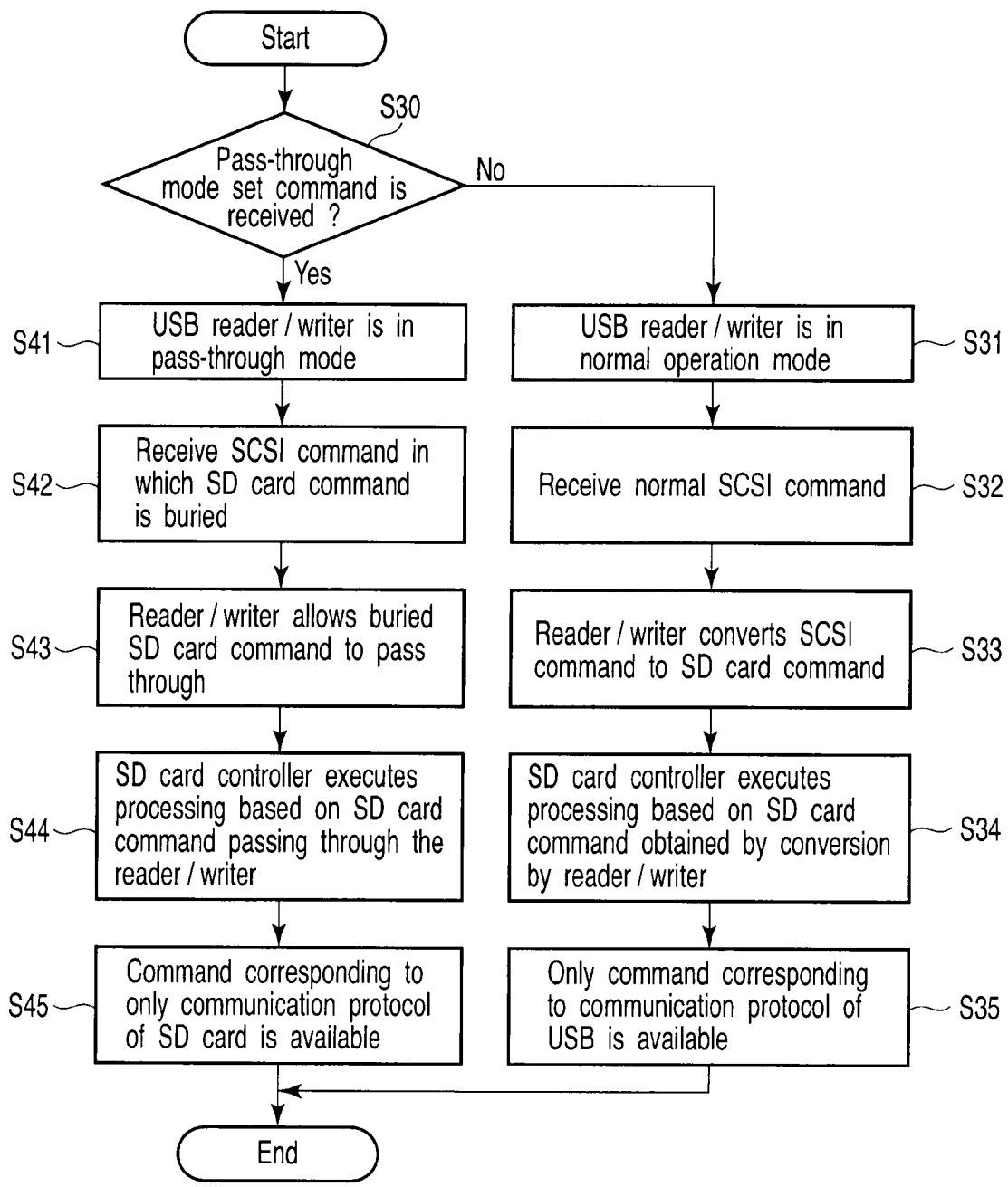
FIG. 17 is a flow chart showing a flow of operations in the memory system according to the second embodiment.

As described above, the pass-through mode can be achieved by the logic interface of this embodiment. Hereinafter, a difference between the normal operation mode and pass-through mode will be described simply with reference to FIG. 17. FIG. 17 is a flow chart showing a flow of the operation of the USB reader/writer 20.

As shown in FIG. 17, unless the USB reader/writer 20 receives a pass-through mode set command (step S30, NO), the USB reader/writer 20 still remains in the normal operation mode (step S31). This operation mode is the same as a conventional USB device. That is, the USB reader/writer 20 receives a normal (conventional) SCSI command from the host device 10 (step S32). For example, the MPU 22 of the USB reader/writer 20 converts the received SCSI command to the SD™ card command and outputs to the SD™ card controller 40 through the interface 25 (step S33). Then, the SD™ card controller 40 executes the processing based on the received SD™ card command (step S34). Because the conventional SCSI command does not support the lock/unlock function, it can use only commands which agree with the communication protocol of the USB, so that it cannot access the lock/unlock function (step S35).

Figure 18:
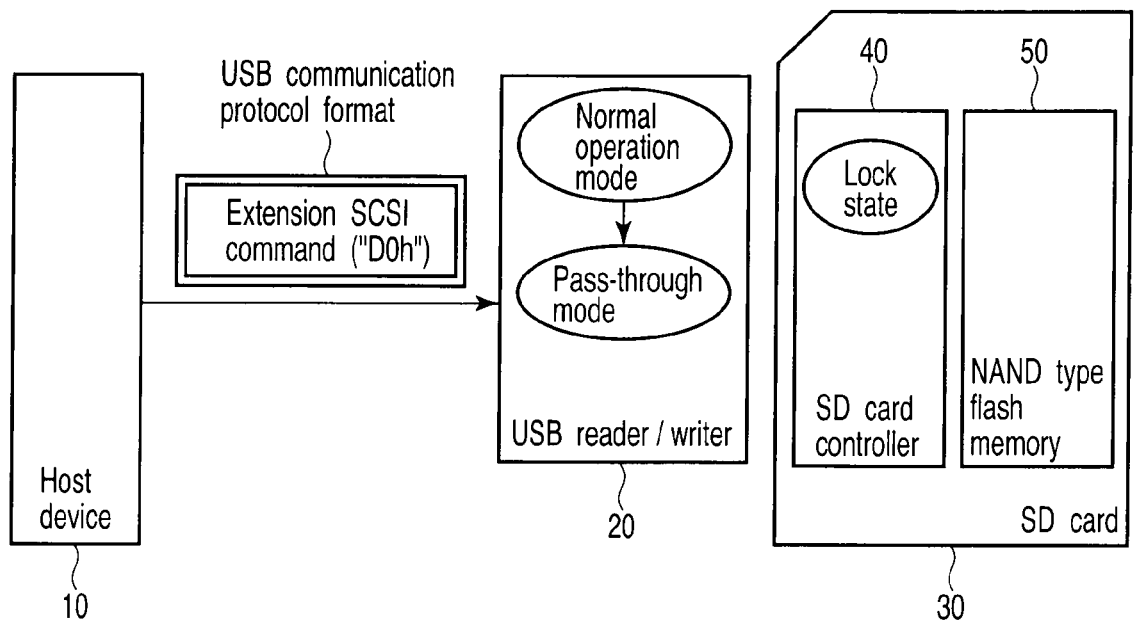
FIG. 18 to FIG. 21 are block diagrams of a memory system according to the second embodiment.

When the pass-through mode set command is received in step S30 (step S30, YES), the USB reader/writer 20 makes the transition to the pass-through mode (step S41). This state is shown in FIG. 18. FIG. 18 is a block diagram of the memory system 1. As shown in figure, the extension SCSI command (pass-through mode set command: "D0h") is sent from the host device 10 to the USB reader/writer 20 in USB communication protocol format. Consequently, the USB reader/writer 20 turns to the pass-through mode. After that, the USB reader/writer 20 becomes capable of receiving other extension SCSI commands "D1h" to "D6h".

Next, the USB reader/writer 20 receives the SCSI command (extension SCSI command) in which the SD™ card command is buried (step S42). Then, the USB reader/writer 20 (MPU 22 of the USB reader/writer 20) allows the SD™ card command of the extension SCSI commands buried therein to pass through and to be output to the SD™ card controller 40 (step S44). Then, the SD™ card controller 40 executes the processing based on the SD™ card command which passes through the USB reader/writer 20 (step S44).

Figure 19:
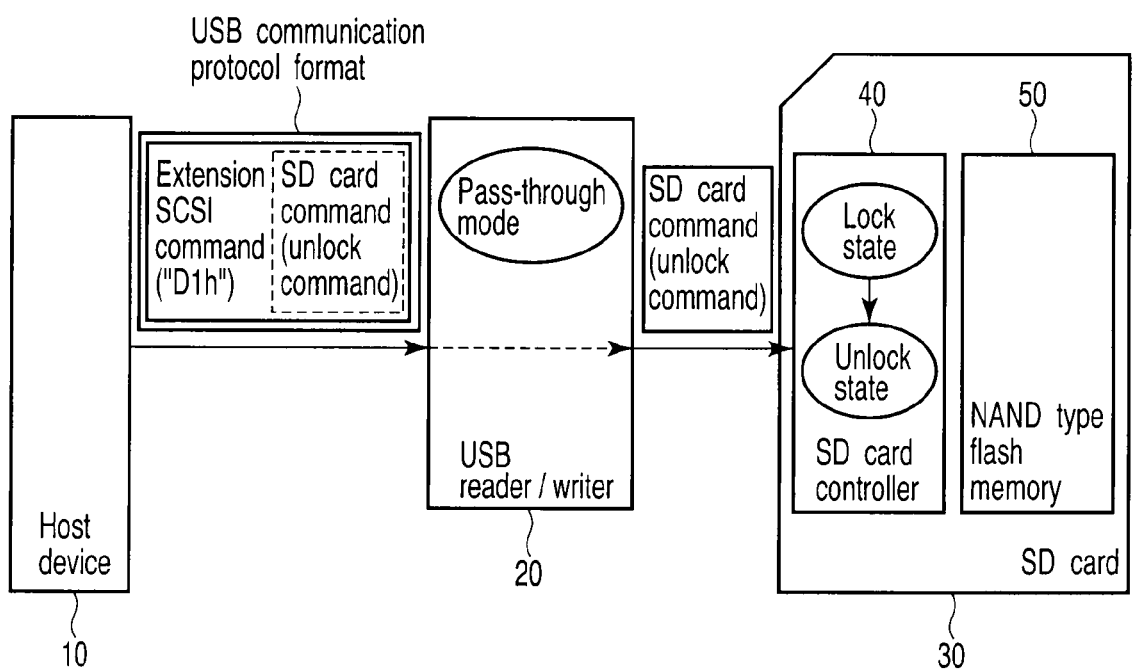

FIG. 19 shows the states of step S42 to S44. FIG. 19 is a block diagram of the memory system 1, which shows a state when the host device 10 issues an unlock command. As shown in the figure, the extension SCSI command (execution command: "D1h") is sent from the host device 10 to the USB reader/writer 20 in the USB communication protocol format. The SD™ card command type unlock command is buried in this SCSI command (see FIG. 11). Then, the USB reader/writer 20 in the pass-through mode allows the unlock command within the SCSI command to pass through and outputs it to the SD card controller 40. As a result, the SD™ card controller 40 is changed to an unlock state.

When the USB reader/writer 20 is changed to the pass-through mode, a command which is supported by only the SD™ card communication protocol can be used (step S45). As a result, the lock/unlock function can be accessed. Further, the copyright protection function which the USB cannot cope with can also be accessed.

Figure 20:
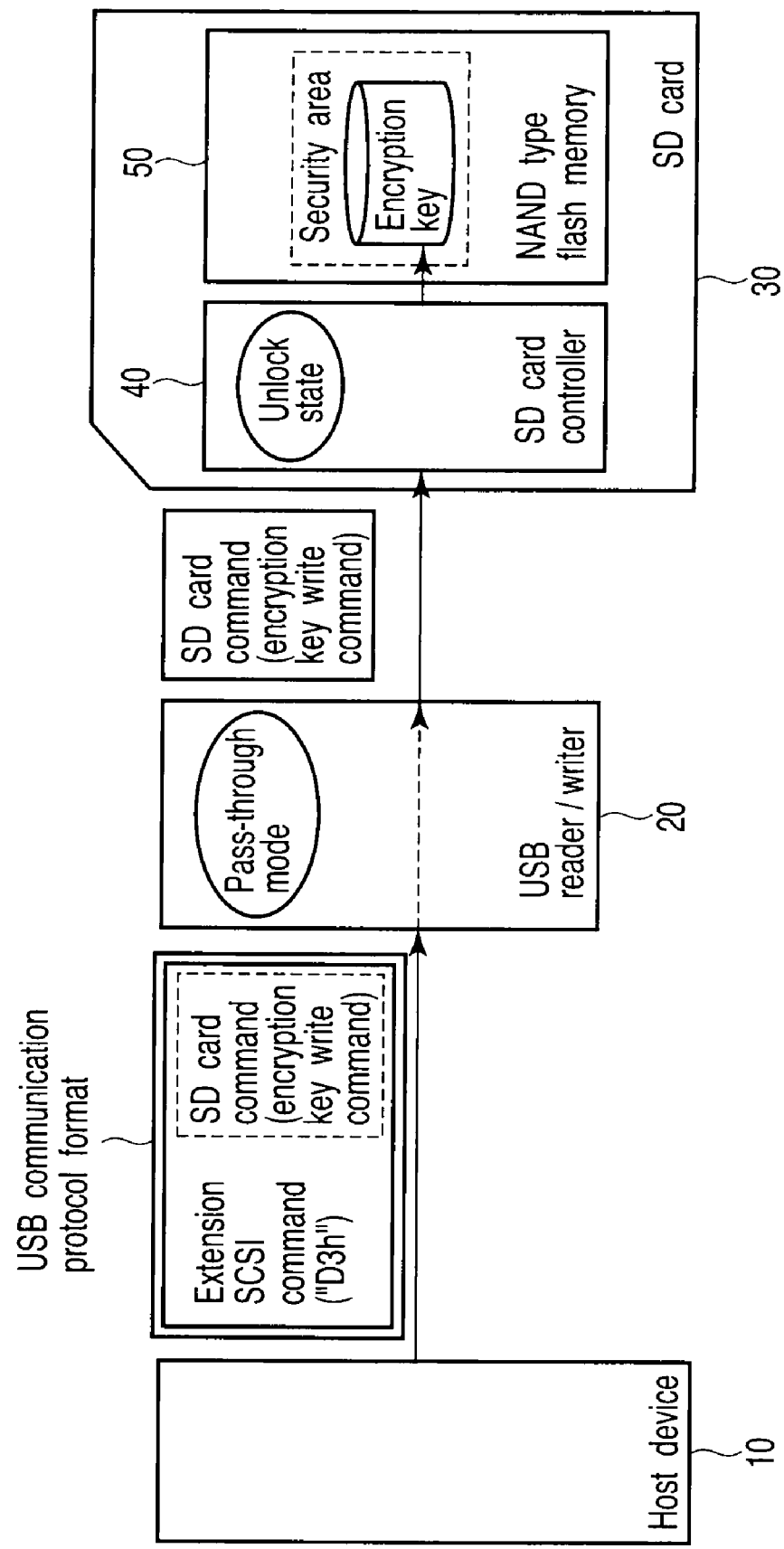

FIG. 20 shows a case of storing an encryption key for encrypting content in the security area of the NAND type flash memory 50 as an example different from the access to the lock/unlock function. As shown in FIG. 20, the extension SCSI command (execution command: "D3h") is sent from the host device 10 to the USB reader/writer 20 in the USB communication protocol format. The encryption key and its write command are buried in this SCSI command in the SD™ card command format (see FIG. 11). Then, the USB reader/writer 20 in the pass-through mode allows the SD™ card command in the SCSI command to pass through and outputs it to the SD™ card controller 40. As a result, the SD™ card controller 40 receives an encryption key write command and writes the encryption key into the security area of the NAND type flash memory 50 following that command.

As described above, the memory system 1 of this embodiment can access the lock/unlock function of the SD™ card 30 by providing the USB reader/writer 20 with the pass-through mode.

Third Embodiment

Figure 21:
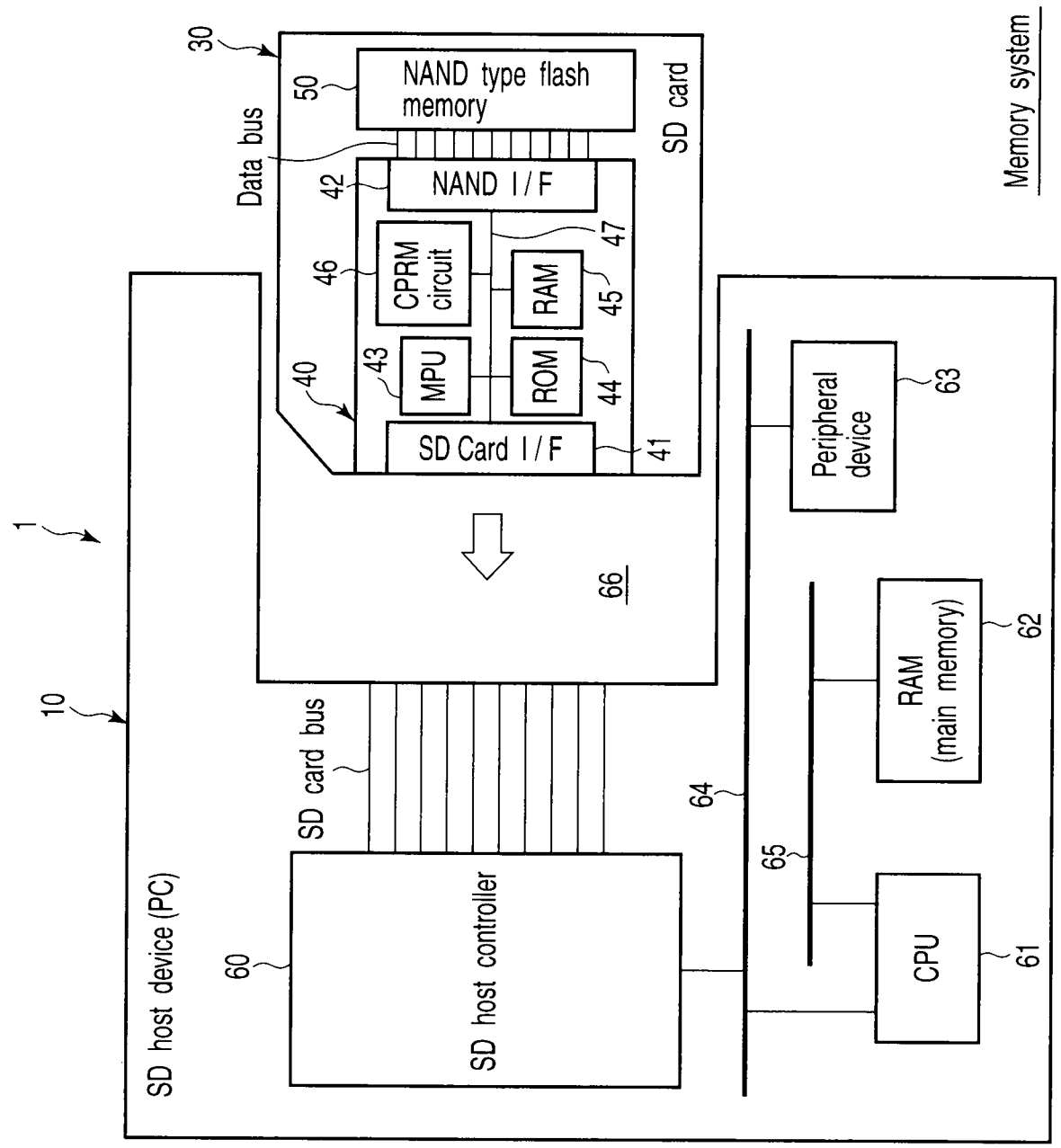

Next, a semiconductor device according to the third embodiment of the present invention will be described. This embodiment corresponds to a case where the host device 10 has a card slot for the SD™ card in the first and second embodiments. FIG. 21 is a block diagram of the memory system 1 according to this embodiment.

As shown in FIG. 21, the memory system 1 has the host device (for example, PC) 10 and the SD™ card 30. Because the structure of the SD™ card 30 is the same as described in the first embodiment, description thereof is not repeated here.

The host device 10 includes an SD™ host controller 60, central processing unit (CPU) 61, RAM (main memory) 62, peripheral device 63, peripheral component interconnect (PCI) bus 64, memory bus 65 and card slot 66.

The SD™ card 30 is inserted into the card slot 66, so that the SD™ host controller 60 and the SD™ card interface 41 of the SD™ card 30 are connected through the SD card bus so that they can communicate with each other.

The SD™ host controller 60 has a function as a USB reader/writer 20 described in the first and second embodiments and, for example, the same structure as the USB reader/writer 20 described with reference to FIG. 1. The SD™ host controller 60 converts a command issued by the CPU 61 to the SD™ command format and outputs the converted command to the SD™ card 30 through the SD card bus. The RAM 62 functions as a main memory for the CPU 61 to execute a processing. The peripheral device 63 is an additional device necessary for constituting the host device 10. The SD™ host controller 60, CPU 61, and peripheral device 63 are connected by the PCI bus 64 so that they can communicate with each other. The CPU 61 and the RAM 62 are connected by the memory bus 65 so that they can communicate with each other.

With this structure, the SD™ host controller 60 carries out a processing of FIG. 2 described in the first embodiment. That is, instead of the USB reader/writer 20 of the first embodiment, the SD™ host controller 60 executes first initialization and second initialization. Then, the SD™ controller notifies the CPU 61 that the SD™ card 30 has been recognized or otherwise.

Even if the SD™ card 30 inserted into the card slot 66 of the host device 10 is in the lock state, the CPU 61 never determines that it is a card error for that reason alone. Thus, the same effect as the first embodiment can be obtained.

Under the structure shown in FIG. 21, the SD™ host controller 60 has the pass-through mode. That is, it is assumed that the command given by the CPU 61 is in a format corresponding to the communication protocol of the PCI bus 64. This format usually does not support the lock/unlock function of the SD™ card 30. Thus, the CPU 61 buries the SD™ card command into an issued command and outputs to the SD™ host controller 60. The SD™ host controller 60 in the pass-through mode fetches out the SD™ card command from the received command and passes through to the SD™ card 30. Consequently, the same effect as the second embodiment can be obtained.

Figure 22:
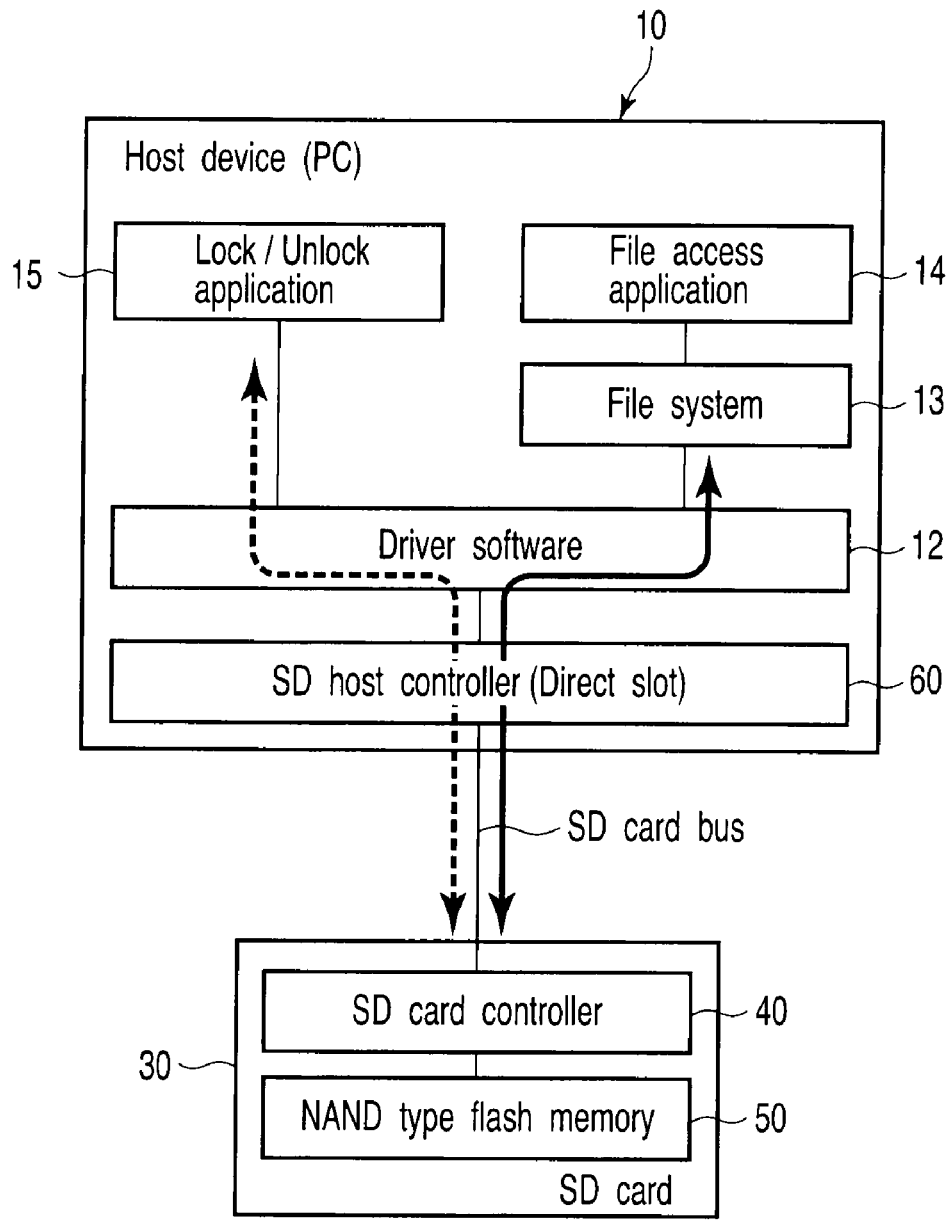
FIG. 22 is a block diagram showing the logic structure of the memory system according to a third embodiment of the present invention.

FIG. 22 is a conceptual diagram showing the logic configuration of the memory system 1 according to this embodiment. When the initialization is completed by the processing described with reference to FIG. 3 in the first embodiment so that the SD™ card 30 is recognized by the CPU 61, an access from the CPU 61 to the SD™ card 30 is carried out. A solid line in FIG. 22 indicates a flow of access in the normal operation mode. That is, it is a flow of the access to the SD™ card 30 in the unlock state. The dotted line indicates a flow of an access to the lock/unlock function in the pass-through mode. That is, it is a flow of access to the SD™ card 30 in the lock state.

As shown in FIG. 22, for the SD™ card 30 in the unlock state, a file access command is issued from an application software 14 on the host device 10 to the file system software 13. Responding to this command, the SD™ host controller 60 issues the SD™ card command so as to execute data write, read and erase to an ordinary memory area in the NAND type flash memory 50. The lock/unlock application 15 on the host device 10 can lock the SD™ card 30 by issuing a lock command using the pass-through mode. Use of the pass-through mode enables the application software 14 to access the security area of the NAND type flash memory 50.

Even if a file access command is issued to the SD™ card 30 in the lock state from the application software 14 like in the unlock state, only an error is sent back from the SD™ card 30 but no actual file access is enabled. However, use of the pass-through mode enables the lock/unlock application 15 to issue the unlock command so as to turn the SD™ card 30 into the unlock state. At this time, the SD™ host controller 60 passes through the unlock command given from the lock/unlock application 15 and outputs it directly to the SD™ card 30.

As described above, the USB reader/writer 20 and the SD™ host controller 60 according to the first to third embodiments have the following structure.

The semiconductor device 20, 60 includes the nonvolatile semiconductor memory 50 and has two operation states, an unlock state which permits an access to the nonvolatile semiconductor memory 50, and a lock state which prohibits the access. The device 20, 60 includes the first interface 25 which can be connected to the memory card 30 so as to communicate with the memory card 30, the second interface 21 which can be connected to the host device 10 for generating a command for an access to the memory card 30 so as to communicate with the host device 10, and the processor 22 in which when the memory card 30 is connected to the first interface 25, the first initialization processing (step S11) for the memory card 30 is carried out using a command recognizable by the memory card 30 in the lock state. When the first initialization processing succeeds (step S12, YES), the processor 22 grasps whether the memory card 30 is in the unlock state or in the lock state (step S14). If the first initialization processing succeeds and the memory card 30 is in the lock state (step S15, YES), the processor 22 sends an information indicating that the memory card 30 is recognized normally to the host device 10 through the second interface 21.

If the first initialization processing succeeds and the memory card is in the unlock state (step S15, NO), the processor 22 carries out the second initialization processing for the memory card 30 using a command which the memory card 30 in the unlock state can recognize and the memory card in the lock state cannot recognize (step S17).

If the first initialization processing succeeds and the memory card is in the lock state (step S15, YES), the processor 22 communicates with the host device without executing the second initialization processing.

With the above-described structure, the memory card in the lock state can be recognized.

Although in the logic interface described in the second embodiment, an example that the pass-through mode is achieved using the SCSI command as an interface class for the pass-through mode like the mass storage class has been described, it is possible to modify the command format so as to obtain other command format than the format for the SCSI command. This example corresponds to the third embodiment.

Although in the above embodiment, a case where the recording medium is provided with the NAND type flash memory has been described, it is possible to replace the NAND type flash memory with other flash memory such as NOR type flash memory, AND type flash memory or other nonvolatile semiconductor memory such as MRAM, ferro-electric memory. Further, such recording medium can be applied to not only the SD™ card but also various kinds of memory cards having the lock/unlock function.

[Example of Initialization Processing for the SD™ Card]

Figure 23:
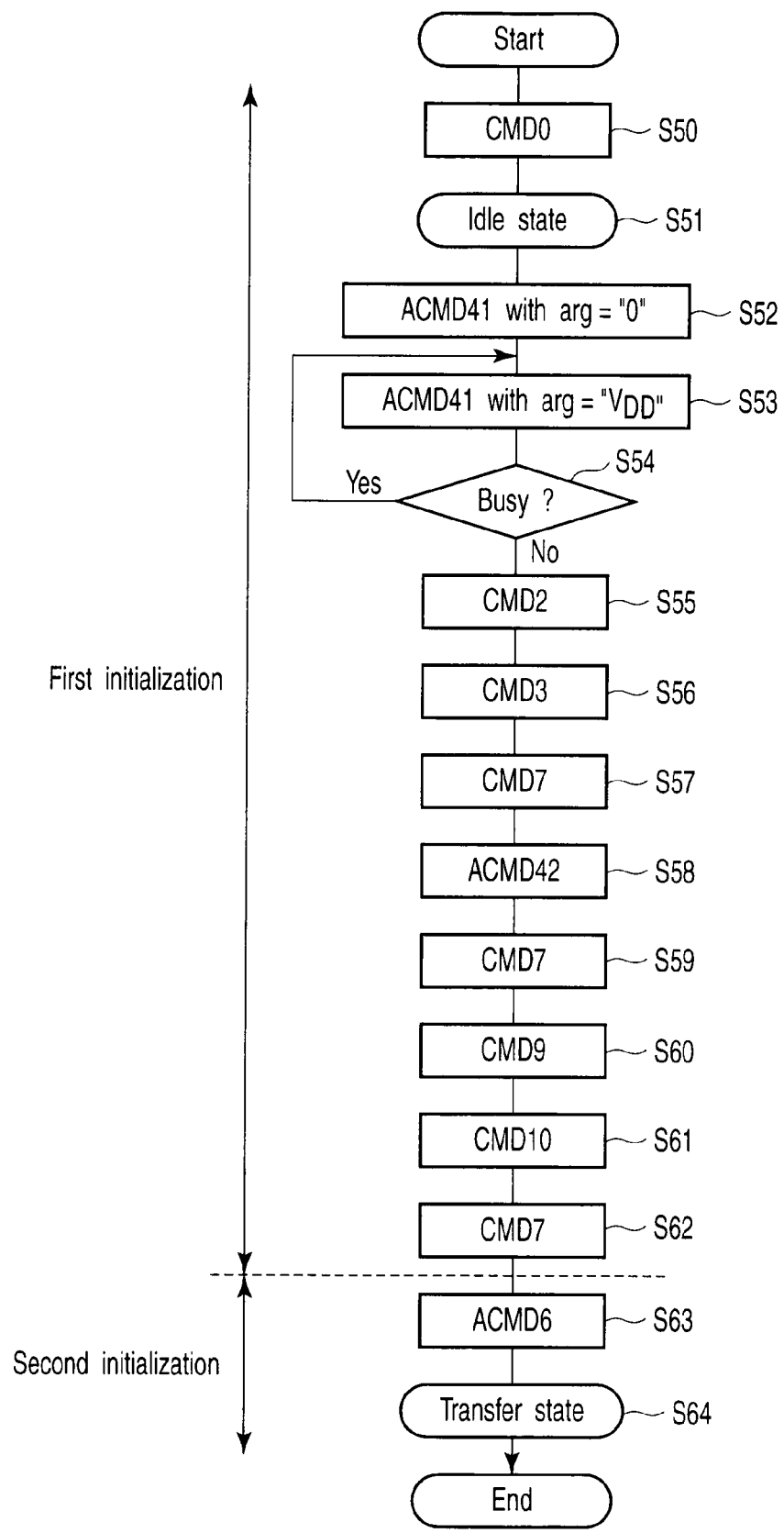
FIG. 23 is a flow chart showing the first and second initialization processes in the memory system according to the first embodiment in detail.

Here, specific examples of the first and second initializations using specific commands (CMD0, CMD2, CMD3, CMD7, CMD9, CMD10, ACMD6 and ACMD41) which the SD™ card uses will be described with reference to FIG. 23. FIG. 23 is a flow chart showing the details of the first and second initialization processings.

The command CMD0 is given from the USB reader/writer 20 to the SD™ card 30 (step S50). The CMD0 is a command which resets the SD™ card 30 into an idle state (step S51).

Subsequently, the command ACMD41 is given to the SD™ card 30. The ACMD41 is a command for identifying the SD™ card not matched with a power source voltage VDD specified by the host device 10. First, the ACMD41 in which "0" is set at an argument is given (step S52). Then, a common voltage range to the SD™ card 30 is confirmed. Subsequently, the command ACMD41 in which the power source voltage "VDD" of the host device 10 is set as an argument is given to the SD™ card 30 (step S53). Thus, the SD™ card 30 is activated by the VDD within the common voltage range.

After that, if the SD™ card 30 turns into the ready state (step S54, NO), the command CMD2 is given to the SD™ card 30 (step S55). Responding to the CMD2, unique ID information of the SD™ card 30 is read out. The ID information contains for example, the manufacturer's ID of the SD™ card 30 and manufacturing date.

Subsequently, the command CMD3 is given to the SD™ card 30 (step S56). Responding to the CMD3, the RCA is read out from the SD™ card 30. This RCA enables the USB reader/writer 20 to recognize the SD™ card 30. Then, the command ACMD42 is given to the SD™ card 30 as required (step S58). The ACMD 42 invalidates a pull-up resistance for detecting the SD™ card 30. After that, the command CMD7 is given while the RCA is set to "0000" (step S59). Consequently, the SD™ card 30 turns into the non-selected state.

Next, the command CMD9 is given to the SD™ card 30 (step S60). The CMD9 reads out a status of the SD™ card 30. The status mentioned here is information about file format, maximum write/read current, minimum write/read current and the like. Subsequently, the ID information of the SD™ card 30 is read out by the command CMD10 (step S61). After that, the command CMD7 is given to the SD™ card 30 and the SD™ card 30 is selected by the USB reader/writer 20 (step S62).

The operation of the above steps S50 to S62 is the first initialization, and in step S60 or S62, whether the SD™ card 30 is in the lock state or in the unlock state is determined.

The second initialization is carried out by issuing the command ACMD6 to the SD™ card 30 after the step S62 (step S63). The size of data bus to be transferred is determined by the ACMD6. As a result of determining the data bus size by the ACMD6, the SD™ card 30 turns into a transfer state capable of transferring data so as to finish the second initialization.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device comprising:
a first interface which is capable of being connected to a memory card and communicating with the memory card, the memory card having a nonvolatile semiconductor memory and having an unlock state and a lock state, the memory card in the unlock state permitting an access to the nonvolatile semiconductor memory, the memory card in the lock state prohibiting the access;
a second interface which is capable of being connected to a host device and communicating with the host device, the host device generating an access command to access the memory card; and
a control unit which is connected to the first interface and the second interface, wherein
the control unit, when the memory card is connected to the first interface, executes a first initialization processing of the memory card using a command which the memory card in the lock state is capable of recognizing and is sent from the host device through the second interface, the first initialization setting the memory card to a state which allows status data of the memory card to be read out,
the control unit, when the first initialization processing succeeds, reads the status data from the memory card to determine whether the memory card is in the unlock state or the lock state,
when the memory card is in the lock state, the control unit is set to a pass-through mode by a command sent from the host device, and
in the pass-through mode, the control unit allows an unlock command to pass through the control unit to the memory card to release the lock state of the memory card.

2. A semiconductor device comprising:
a first interface which is capable of being connected to a memory card and communicating with the memory card, the memory card having a nonvolatile semiconductor memory and having an unlock state and a lock state, the memory card in the unlock state permitting an access to the nonvolatile semiconductor memory, the memory card in the lock state prohibiting the access;
a second interface which is capable of being connected to a host device and communicating with the host device, the host device generating a access command to access the memory card; and
a control unit which, when the memory card is connected to the first interface, executes a first initialization processing of the memory card using a first command which the memory card in the lock state is capable of recognizing, the control unit, when the first initialization processing succeeds, determining whether the memory card is in the unlock state or the lock state, and when the memory card is in the lock state, sending information indicating that the memory card is recognized normally from the second interface to the host device, wherein
the device includes a first operation mode and a second operation mode,
in the first operation mode, a third command received by the second interface from the host device is converted to a fourth command different in the command format and the fourth command is output to the memory card from the first interface, and
in the second operation mode, the second interface receives the third command in which the fourth command is buried and the first interface outputs the fourth command fetched out of the third command to the memory card.

3. The device according to claim 2, wherein the control unit, when the first initialization processing succeeds and the memory card is in the unlock state, executes a second initialization processing of the memory card using a second command which the memory card in the unlock state is capable of recognizing and the memory card in the lock state is incapable of recognizing.

4. The device according to claim 3, wherein the control unit, when the first initialization processing succeeds and the memory card is in the lock state, sends an information indicating that the memory card has been recognized normally to the host device without executing the second initialization processing.

5. The device according to claim 2, wherein:
the control unit is connected to the first interface and the second interface,
the first initialization sets the memory card to a state which allows status data of the memory card to be read out, and
the control unit, when the first initialization processing succeeds, reads the status data from the memory card to determine whether the memory card is in the unlock state or the lock state.

6. The device according to claim 2, wherein
the third command has a command format which the device and the host device are capable of recognizing, and
the fourth command has a command format which the memory card is capable of recognizing.

7. The device according to claim 6, wherein the second interface receives a command to change the memory card from the lock state to the unlock state or a command to change the memory card from the unlock state to the lock state from the host device as the fourth command buried in the third command.

8. The device according to claim 6, wherein the device is changed to the second operation mode when the second interface receives the third command, which instructs the device to change to the second operation mode, from the host device.

9. The device according to claim 6, wherein
the memory card has a copyright protection function, and
the fourth command contains a command to enable the copyright protection function.

10. The device according to claim 9, wherein
in the second operation mode, data with the copyright protection given from the memory card is output from the second interface to the host device through the first interface, or
data with the copyright protection given from the host device is output from the first interface to the memory card through the second interface.

11. The device according to claim 2, wherein when the second interface receives a response acquisition command from the host device, the second interface outputs a response which is sent from the memory card and is received at the first interface.

12. A memory card initialization method, the memory card having a nonvolatile semiconductor memory and having an unlock state which permits an access to the nonvolatile semiconductor memory and a lock state which prohibits the access, comprising:
initializing the memory card using a first command which the memory card in the lock state is capable of recognizing;
when the initialization using the first command succeeds, determining whether the memory card is in the lock state or in the unlock state;
when it is determined that the memory card is in the unlock state, initializing the memory card using a second command which the memory card in the unlock state is capable of recognizing and the memory card in the lock state is incapable of recognizing;
when it is determined that the memory card is in the lock state or the initialization using the second command succeeds, notifying the host device that the memory card has been recognized; and
receiving a mode change command from the host device, after a notification of recognizing the memory card when it is determined that the memory card is in the lock state, wherein
a command given from the host device has a first command format which the host device is capable of recognizing and a command given to the memory card has a second command format which the memory card is capable of recognizing,
before the mode change command is received, the command given from the host device is converted to the second command format and output to the memory card, and
after the mode change command is received, a command having the second command format buried in the command given from the host device is passed through to the memory card.

13. The method according to claim 12, further comprising, when the initialization using the first command fails or the initialization using the second command fails, notifying the host device of a card error.

14. The method according to claim 12, further comprising:
receiving a third command in which a fourth command of changing the memory card from the lock state to the unlock state is buried from the host device, after a notification of recognizing the memory card when it is determined that the memory card is in the lock state; and
outputting the fourth command fetched out of the third command to the memory card so as to change the memory card from the lock state to the unlock state.

15. The method according to claim 14, wherein
the third command has a command format which the host device is capable of recognizing, and
the fourth command has a command format which the memory card is capable of recognizing.

16. The method according to claim 12, further comprising:
receiving a third command in which a fourth command having the second command format and of changing the memory card from the lock state to the unlock state is buried from the host device, after the mode change command is received; and
changing the memory card from the lock state to the unlock state by passing the fourth command through to the memory card.

* * * * *